United States Patent
Ross et al.

(10) Patent No.: US 12,369,227 B2
(45) Date of Patent: Jul. 22, 2025

(54) SYSTEMS AND METHODS FOR BUILDING WIRELESS COMMUNICATION MESH NETWORKS USING POLE STRUCTURES

(71) Applicant: L3VEL, LLC, Wilmington, DE (US)

(72) Inventors: Kevin Ross, Lehi, UT (US);
Muhammad Ahsan Naim, Irving, TX (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 18/432,165

(22) Filed: Feb. 5, 2024

(65) Prior Publication Data

US 2024/0298382 A1 Sep. 5, 2024

Related U.S. Application Data

(63) Continuation of application No. 16/838,365, filed on Apr. 2, 2020, now Pat. No. 11,895,739.
(Continued)

(51) Int. Cl.
*H04W 88/10* (2009.01)
*H04W 84/22* (2009.01)
*H04W 88/06* (2009.01)

(52) U.S. Cl.
CPC ........... *H04W 88/10* (2013.01); *H04W 84/22* (2013.01); *H04W 88/06* (2013.01)

(58) Field of Classification Search
CPC ...... H04W 88/10; H04W 84/22; H04W 88/06
See application file for complete search history.

(56) References Cited

U.S. PATENT DOCUMENTS

| 6,060,658 A | 5/2000 | Yoshida et al. |
| 8,385,921 B1 | 2/2013 | Shousterman et al. |

(Continued)

FOREIGN PATENT DOCUMENTS

| KR | 20090062277 A1 | 6/2009 |
| KR | 20170017920 A1 | 2/2017 |
| WO | 2018083548 A1 | 5/2018 |

OTHER PUBLICATIONS

International Searching Authority International Search Report and Written Opinion mailed on Jul. 17, 2020, issued in connection with International Application No. PCT/US2020/026364, filed Apr. 2, 2020, 16 pages.

(Continued)

*Primary Examiner* — Mounir Moutaouakil
(74) *Attorney, Agent, or Firm* — LEE SULLIVAN SHEA & SMITH LLP

(57) ABSTRACT

Disclosed herein are systems and methods relating to wireless communication mesh networks. In one aspect, the disclosed systems and methods may involve (1) a preexisting fiber network associated with a geographical area that includes buildings, where the preexisting fiber network comprises preexisting fiber links, (2) a first fiber link that is spliced into a given one of the preexisting fiber links coupled to the preexisting fiber network at a given location that was identified as being convenient for extending the preexisting fiber network, (3) a second fiber link that is deployed between the given location and a given building that is closest to the given location, where the given building is configured to serve as a seed node of a wireless communication mesh network that has backhaul connectivity through the preexisting fiber network, and (4) one or more point-to-point or point-to-multipoint communication links that originate from the seed node.

20 Claims, 17 Drawing Sheets

Related U.S. Application Data

(60) Provisional application No. 62/828,336, filed on Apr. 2, 2019.

(56) References Cited

U.S. PATENT DOCUMENTS

| | | |
|---|---|---|
| 8,406,126 B1 | 3/2013 | Leiba et al. |
| 9,425,985 B1 | 8/2016 | Shousterman et al. |
| 9,538,331 B2 | 1/2017 | Ross et al. |
| 9,591,486 B2 | 3/2017 | Huber et al. |
| 9,621,465 B2 | 4/2017 | Ross |
| 9,860,179 B2 | 1/2018 | Ross |
| 9,942,776 B2 | 4/2018 | Ross et al. |
| 9,973,939 B2 | 5/2018 | Ross |
| 10,027,508 B2 | 7/2018 | Leiba et al. |
| D856,962 S | 8/2019 | Hart et al. |
| 10,447,378 B1 | 10/2019 | Kim et al. |
| 10,476,128 B1 | 11/2019 | Kim et al. |
| 10,477,411 B1 | 11/2019 | Liu et al. |
| 10,530,851 B1 | 1/2020 | Hart |
| 10,530,882 B2 | 1/2020 | Ross |
| 10,548,026 B1 | 1/2020 | Liu |
| 11,246,180 B2 | 2/2022 | Ross et al. |
| 2005/0068902 A1 | 3/2005 | Rath |
| 2008/0143491 A1 | 6/2008 | Deaver |
| 2012/0020060 A1 | 1/2012 | Myer et al. |
| 2014/0057570 A1 | 2/2014 | Leiba |
| 2014/0105606 A1 | 4/2014 | Vaananen |
| 2014/0254579 A1 | 9/2014 | Huber et al. |
| 2015/0358082 A1 | 12/2015 | Ross |
| 2017/0048775 A1 | 2/2017 | Kim |
| 2018/0172229 A1 | 6/2018 | Lockwood et al. |
| 2018/0249346 A1 | 8/2018 | Plestid et al. |
| 2018/0331935 A1 | 11/2018 | Ross et al. |
| 2018/0343685 A1 | 11/2018 | Hart et al. |
| 2020/0187022 A1 | 6/2020 | Ross et al. |

OTHER PUBLICATIONS

Chile Patent Office, Chile Examination Report mailed on Mar. 20, 2023 (and corresponding translation), issued in connection with Chile Application No. 2021-002526, 28 pages.

Indian Patent Office, Examination Report mailed on Jul. 7, 2023, issued in connection with Indian Patent Application No. 202147049555, 6 pages.

Chile Patent Office, Chile Examination Report mailed on Dec. 14, 2023 (and corresponding translation), issued in connection with Chile Application No. 2021- 002526, 46 pages.

Israel Patent Office, Examination Report and Translation mailed on Dec. 24, 2023, issued in connection with Israel Patent Application No. 286828, 3 pages.

Ranaweera, Chathurika, et al. "Design and optimization of fiber optic small-cell backhaul based on an existing fiber-to- the-node residential access network." IEEE Communications Magazine 51.9 (2013): pp. 62-69.

Kazovsky, Leonid, et al. "Hybrid optical-wireless access networks." Proceedings of the IEEE 100.5 (2012): pp. 1197-1225.

European Patent Office, Extended Search Report mailed on Nov. 28, 2022, issued in connection with European Application No. 20781930.1, 11 pages.

United Arab Emirates Patent Office, United Arab Emirates Search Report and Examination Report mailed on Jul. 21, 2024, issued in connection with United Arab Emirates Application No. P6001774/21, 7 pages.

Colombia Patent Office, Colombia Examination Report mailed on Nov. 7, 2024 (and corresponding translation), issued in connection with Colombia Application No. 2021/0014176, 35 pages.

European Patent Office, European EPC Article 94.3 mailed on Mar. 6, 2025, issued in connection with European Application No. 20781930.1, 7 pages.

Indian Patent Office, Hearing Notice mailed on Feb. 4, 2025, issued in connection with Indian Patent Application No. 202147049555, 3 pages.

SYSTEMS AND METHODS FOR BUILDING WIRELESS COMMUNICATION MESH NETWORKS USING POLE STRUCTURES

CROSS-REFERENCE TO RELATED APPLICATIONS

This application is a continuation of, and claims priority to, U.S. Non-Provisional patent application Ser. No. 16/838,365, filed Apr. 2, 2020, and entitled "SYSTEMS AND METHODS FOR BUILDING WIRELESS COMMUNICATION MESH NETWORKS USING POLE STRUCTURES," which claims priority to U.S. Provisional App. No. 62/828,336, filed Apr. 2, 2019, and entitled "METHODS FOR BUILDING WIRELESS MESH NETWORK USING SOLAR POWERED POLES," each of which is incorporated herein by reference in its entirety.

BACKGROUND

Wired and wireless networking and communications systems are widely deployed to provide various types of communication and functional features, including but not limited to those for high-speed internet, security and automation, and/or others. These systems may be capable of supporting communications with a user via a communication connection or a system management action.

Current wireless communication mesh network design approaches face many challenges. For instance, due to use of the millimeter wave spectrum and relatively short length of a wireless link, a large number of access points or base stations are required to provide coverage over an area that can otherwise be covered by a single cell tower transmitting signals at a low frequency band. Generally speaking, these base stations or access points require power and backhaul connectivity to provide coverage. However, providing power and backhaul connectivity to a large number of small cell or access point sites is typically very expensive and challenging and makes wireless network rollout based on high frequencies (e.g., the millimeter wave spectrum) very expensive as well.

Accordingly, there exists a need in the art for improved systems and methods relating to wireless communication mesh network design based on higher frequencies (e.g., the millimeter wave spectrum).

OVERVIEW

The present disclosure, for example, relates to wireless networks and communications including, but not limited to, broadband internet services to end users, security and/or automation systems. In particular, disclosed herein are systems and methods that relate to wireless communication mesh networks (e.g., narrow beam wireless communication mesh networks), associated systems, and/or operations relating to wireless communication mesh networks. In one aspect, the present systems and methods may facilitate designing, operating, and/or modifying wireless communication mesh networks. In another aspect, the present systems and methods may relate to and account for wireless communication nodes (e.g., seed nodes) that are capable of establishing point-to-point ("ptp") extremely-narrow-beam communication links, ptp steerable extremely-narrow-beam communication links, ptp multiple extremely-narrow-beam communication links, point-to-multipoint ("ptmp") narrow beam communication links, ultra-wide-band ptp communication links and/or a combination of ptp and ptmp communication links, among other possibilities.

In accordance with the present disclosure, in some embodiments, an existing fiber network may be extended to a property (e.g., a home, a commercial building, etc.) to provide high-speed internet service, which may involve identifying a location on the existing fiber network that is most convenient to extend a new fiber link and connecting the property (e.g., a home, a commercial building, etc.) to the existing fiber network. This most convenient location on the existing fiber network may be located in various parts of a given neighborhood in which the property resides.

As one possibility, the most convenient location may be located at a fiber access point on the existing fiber network, where a first fiber link can be easily extended from an existing fiber link on the existing fiber network without digging the ground. A second fiber link may then be extended from the fiber access point to the property (e.g., by digging the ground from the fiber access point to the property and deploying the second fiber link between the fiber access point and the property).

As another possibility, the most convenient location may be located at a fiber splice point on the existing fiber network, where a first fiber link can be easily extended from an existing fiber link on the existing fiber network without digging the ground. A second fiber link may then be extended from the fiber splice point to the property (e.g., by digging the ground from the fiber splice point to the property and deploying the second fiber link between the fiber splice point and the property).

As yet another possibility, the most convenient location may be located at an underground conduit (e.g., an electric conduit or any other type of conduit capable of carrying a fiber link) on the existing fiber network or in close proximity to existing fiber network, where a first fiber link can be easily extended from an existing fiber link on the existing fiber network without digging the ground. A second fiber link may then be extended from the underground conduit to the property (e.g., by deploying the second fiber link between the underground conduit and the property).

As a further possibility, the most convenient location may be located in close proximity to an aerial fiber link on the existing fiber network, where a first fiber link can be easily extended from an existing fiber link on the fiber network without digging the ground. A second fiber link may then be extended from the aerial fiber link to the property (e.g., by digging the ground from the aerial fiber link to the property and running the second fiber link between the aerial fiber link and the property).

The most convenient location on the existing fiber network may be located in various other parts of a given neighborhood as well.

In practice, methods for connecting a property to an existing fiber network of a given neighborhood may begin with identifying the property and then identifying a most convenient location that is convenient to splice a new fiber link into the existing fiber network in the given neighborhood. While these methods have many advantages in terms of cost and time, these methods can still be costly depending on the distance between the property that is to be connected to the existing fiber network and the most convenient location on the existing fiber network for fiber link splicing. However, in certain scenarios where there may be some flexibility in choosing the property that is to be connected to the existing fiber network, methods for connecting a property to an existing fiber network can be improved to further reduce both time and cost. Such an improved method may take various forms and may be carried out in various manners.

As one example, the improved method may involve (1) identifying a most convenient location on an existing fiber network in a neighborhood, (2) identifying a property that is to be connected to the existing fiber network and that is closest to the identified most convenient location, (3) splicing a first fiber link into an existing fiber link of the existing fiber network at the identified most convenient location, and (4) deploying a second fiber link between the identified most convenient location and the identified property.

In accordance with the present disclosure, in line with the discussion above, the location of a property that is connected to an existing fiber network in a neighborhood may be used to build a wireless communication mesh network. For instance, the location of the property that is connected to the existing fiber network may be used as a seed node of a wireless communication mesh network with backhaul connectivity through the existing fiber network and originate one or more ptp and/or ptmp communication links from that location.

In some embodiments, a wireless communication mesh network may be built in a neighborhood by installing a pole structure that includes ptp and/or ptmp radios in an easement area of the neighborhood and using the pole structure as a seed node of the wireless communication mesh network with backhaul connectivity through an existing fiber network in the neighborhood. The pole structure may then originate ptp and/or ptmp communication links, and these ptp and/or ptmp communication links may be communicatively coupled to one or more properties (e.g., residential property units) that may be used as seed homes for the wireless communication mesh network.

Accordingly, methods for building a wireless communication mesh network may take various forms.

For instance, one example method may involve (1) identifying a most convenient location on the existing fiber network of a neighborhood next to an easement area, (2) installing a pole structure in the easement area next to the identified most convenient location, (3) splicing a first fiber link into an existing fiber link of the existing fiber network at the identified most convenient location, (4) deploying a second fiber link between the identified most convenient location and the pole structure, and (5) building a wireless communication mesh network by installing ptp and/or ptmp radios on the pole structure and using the pole structure as a seed node of the wireless mesh network with backhaul connectivity through the existing fiber network. The ptp and/or ptmp radios installed on the pole structure may be powered via a variety of power sources, including regular electric power from a utility company, solar power, among other types of power sources.

Generally speaking, the pole structure mentioned above may take various forms. For instance, the pole structure may comprise cylindrical solar cell panels that can provide power to the ptp and/or ptmp radios (among other electronic circuitry) that are installed on the pole structure. It should be understood that any number of solar cell panels can be integrated with the pole structure, which may depend on the total power requirement of the ptp and/or ptmp radios and associated hardware installed on the pole structure. The cylindrical shape of the solar cell panels may help the pole structure (including the solar cell panels and/or modules and the ptp and/or ptmp radios) from swaying during high wind conditions in addition to being aesthetically appealing.

The communication links originating from the pole structure may take various forms as well. For instance, communication links originating from the pole structure may be either (1) ptp communication links that may be steerable or non-steerable and have very-narrow beams and low side lobes, or (2) ptmp communication links with beam selection capability, which may allow ptmp radios to switch to a different beam in another direction to ensure connectivity with the wireless communication mesh network in the event of interference that may result from changes in the line-of-sight profile of the mesh network node link. In general, any number of ptp and/or ptmp communication links may originate from the pole structure, and this number may depend on the power budget and/or the wireless communication mesh network topology, etc.

In accordance with the present disclosure, in another aspect, disclosed herein are systems and methods that relate to wireless communication mesh network design, installation, and deployment. For instance, after building a wireless communication mesh network as described above, the present systems and methods may involve a pre-marketing phase that includes various sub-phases, such as social media/online marketing, radio/television-based marketing, and mailer-based marketing, that can generate leads for potential customers (and/or their corresponding customer locations) that expressed interest in subscribing to an internet service based on a wireless communication mesh network. Based on these leads, an area of interest ("AOI") is identified that is used for subsequent door-to-door marketing and sales. A door-to-door marketing/sales agent then uploads information about potential customers who signed an agreement to a computing system (e.g., a server or shared drive) or accesses a software application (e.g., a mobile application) to provide real-time information about potential customers (e.g., mesh network information associated with a given potential customer) to a network-planning engine. The software application may also receive information about potential customers from the pre-marketing phase and send the information to the network-planning engine.

Based on various criteria defined herein, the network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer (and/or its respective location) from a disqualified status to a selected status or from a selected status to a disqualified status. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. A similar indoor power box as explained earlier may also be installed during this door-to-door marketing phase. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

In another aspect, the present systems and methods may involve identifying an AOI that is selected based on multiple factors. Based on the identified AOI, a pre-marketing phase that includes various sub-phases, such as social media/online marketing, radio/television-based marketing and mailer-based marketing, is executed to generate leads for potential customers (and/or their corresponding customer locations) that expressed interest in subscribing to an internet service based on a wireless communication mesh network. The disclosed process may then transition to a door-to-door marketing phase as described above.

Based on various criteria defined herein, a network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer location from a disqualified status to a selected status and vice versa. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

Accordingly, in one aspect, disclosed herein is a communication system that includes (1) a preexisting fiber network associated with a geographical area that includes a plurality of buildings, wherein the preexisting fiber network comprises a plurality of preexisting fiber links, (2) a first fiber link that is spliced into a given one of the plurality of preexisting fiber links coupled to the preexisting fiber network at a given location that was identified as being convenient for extending the preexisting fiber network, and (3) a second fiber link that is deployed between the given location and a given building of the plurality of buildings that is closest to the given location.

In another aspect, disclosed herein is a communication system that includes (1) a preexisting fiber network associated with a geographical area that includes a plurality of buildings, wherein the preexisting fiber network comprises a plurality of preexisting fiber links, (2) a first fiber link that is spliced into a given one of the plurality of preexisting fiber links coupled to the preexisting fiber network at a given location that was identified as being convenient for extending the preexisting fiber network, (3) a second fiber link that is deployed between the given location and a given building of the plurality of buildings that is closest to the given location, wherein the given building is configured to serve as a seed node of a wireless communication mesh network that has backhaul connectivity through the preexisting fiber network, and (4) one or more ptp or ptmp communication links that originate from the seed node.

In yet another aspect, disclosed herein is a communication system that includes (1) a preexisting fiber network associated with a geographical area that includes a plurality of buildings and one or more easement areas, wherein the preexisting fiber network comprises a plurality of preexisting fiber links, (2) a first fiber link that is spliced into a given one of the plurality of preexisting fiber links coupled to the preexisting fiber network at a given location that is in close proximity to a given easement area of the one or more easement areas, wherein the given easement area comprises a pole structure that has been installed, (3) a second fiber link that is deployed between the given location and the pole structure in the given easement area, wherein the pole structure in the given easement area is configured to serve as a seed node of a wireless communication mesh network that has backhaul connectivity through the preexisting fiber network, and (4) one or more ptp or ptmp communication links that originate from the seed node.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

As noted above, disclosed herein are systems and methods that relate to wireless communication mesh networks (e.g., narrow beam wireless communication mesh networks), associated systems, and/or operations relating to wireless communication mesh networks. In one aspect, the present systems and methods may facilitate designing, operating, and/or modifying wireless communication mesh networks. In another aspect, the present systems and methods may relate to and account for wireless communication nodes (e.g., seed nodes) that are capable of establishing point-to-point ("ptp") extremely-narrow-beam communication links, ptp steerable extremely-narrow-beam communication links, ptp multiple extremely-narrow-beam communication links, point-to-multipoint ("ptmp") narrow beam communication links, ultra-wide-band ptp communication links and/or a combination of ptp and ptmp communication links, among other possibilities.

In accordance with the present disclosure, in some embodiments, an existing fiber network may be extended to a property (e.g., a home, a commercial building, etc.) to provide high-speed internet data. For instance, an existing fiber network may be extended to a residential property in a given neighborhood.

Figure 1:
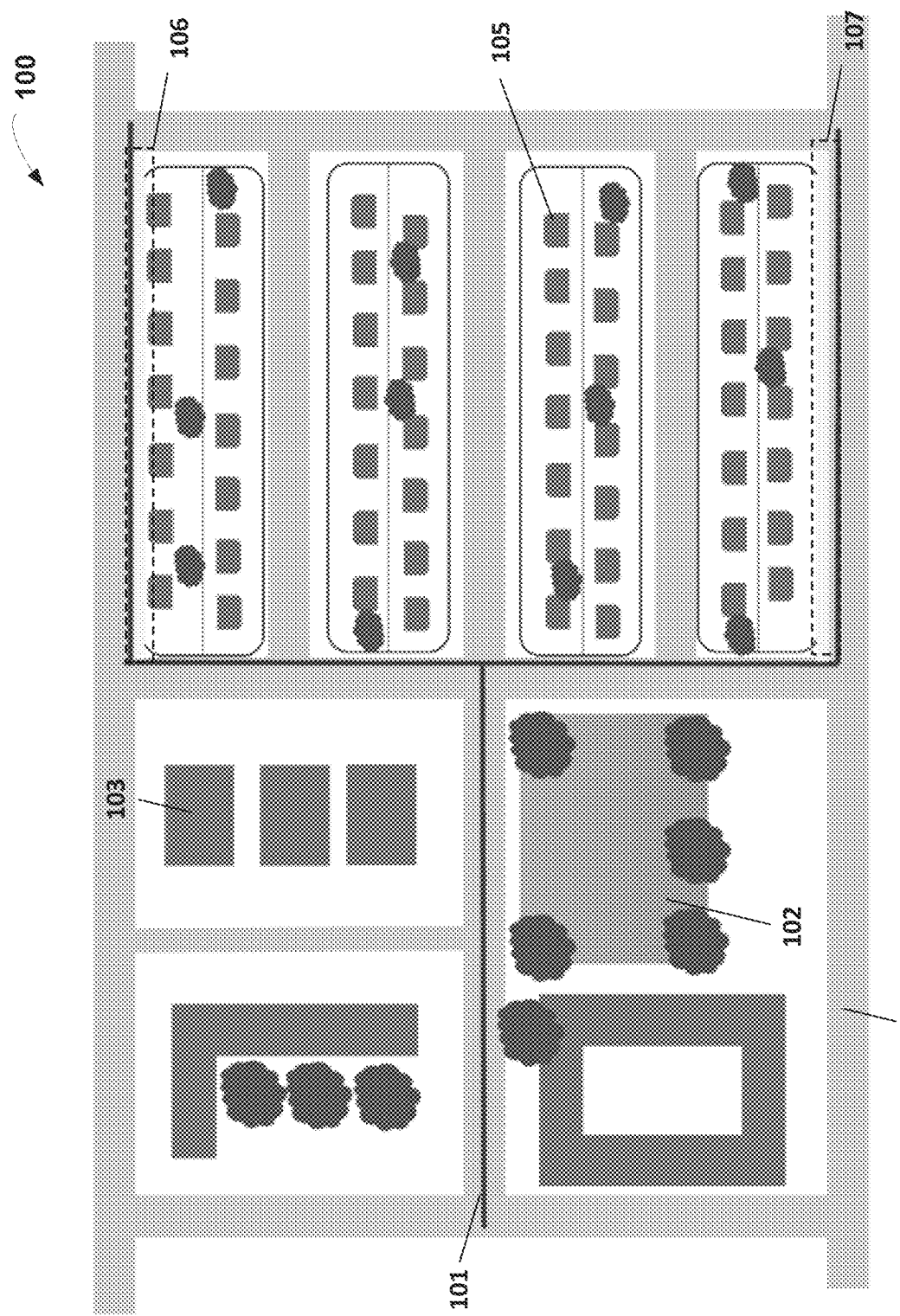
FIG. 1 depicts an example diagram of a neighborhood comprising a fiber network, in accordance with various aspects of this disclosure.

Referring to FIG. 1, an example neighborhood 100 is shown. As shown, neighborhood 100 may comprise many different types of infrastructures, including parks (e.g., park 102), commercial buildings (e.g., commercial building 103), streets (e.g., street 104), residential property units (e.g., home 105), and easement areas (e.g., easement areas 106 and 107).

Generally speaking, the residential property units (e.g., home 105) in neighborhood 100 may take various forms. For instance, the residential property units may comprise single-family homes and/or multiple dwelling units (MDUs), among other possibilities.

Commercial buildings (e.g., commercial building 103) in neighborhood 100 may take various forms as well. For instance, the commercial buildings in neighborhood 100 may include different types of commercial buildings (e.g., retail stores, office buildings, hotels, etc.) that may vary in shape and/or size.

As further shown in FIG. 1, neighborhood 100 may also include fiber optical cable links (e.g., fiber link 101) (which may be simply referred to herein as "fiber links") of a fiber optic cable network (which may be simply referred to herein as a "fiber network") with very high bandwidth and are capable of carrying a large volume of data. These fiber links (e.g., fiber link 101) are typically installed underground but can also be aerial in some locations of neighborhood 100 and can also be part of a large fiber network deployed by fiber optic cable companies in the U.S. or can be government-owned as is the case with many other countries around the world.

In practice, entities that own fiber networks in metropolitan areas spend a very large amount of capital expenditure ("CAPEX") to build fiber networks. In fact, in some cities in the U.S., the cost to deploy a fiber optic cable line can be $100 to $200 per foot. In addition to the higher cost, building or extending a fiber network may take a relatively long period of time even for short fiber links due to delays in getting permits to dig roads, sidewalks, and/or, driveways, among other infrastructure in a given neighborhood.

Figure 2:
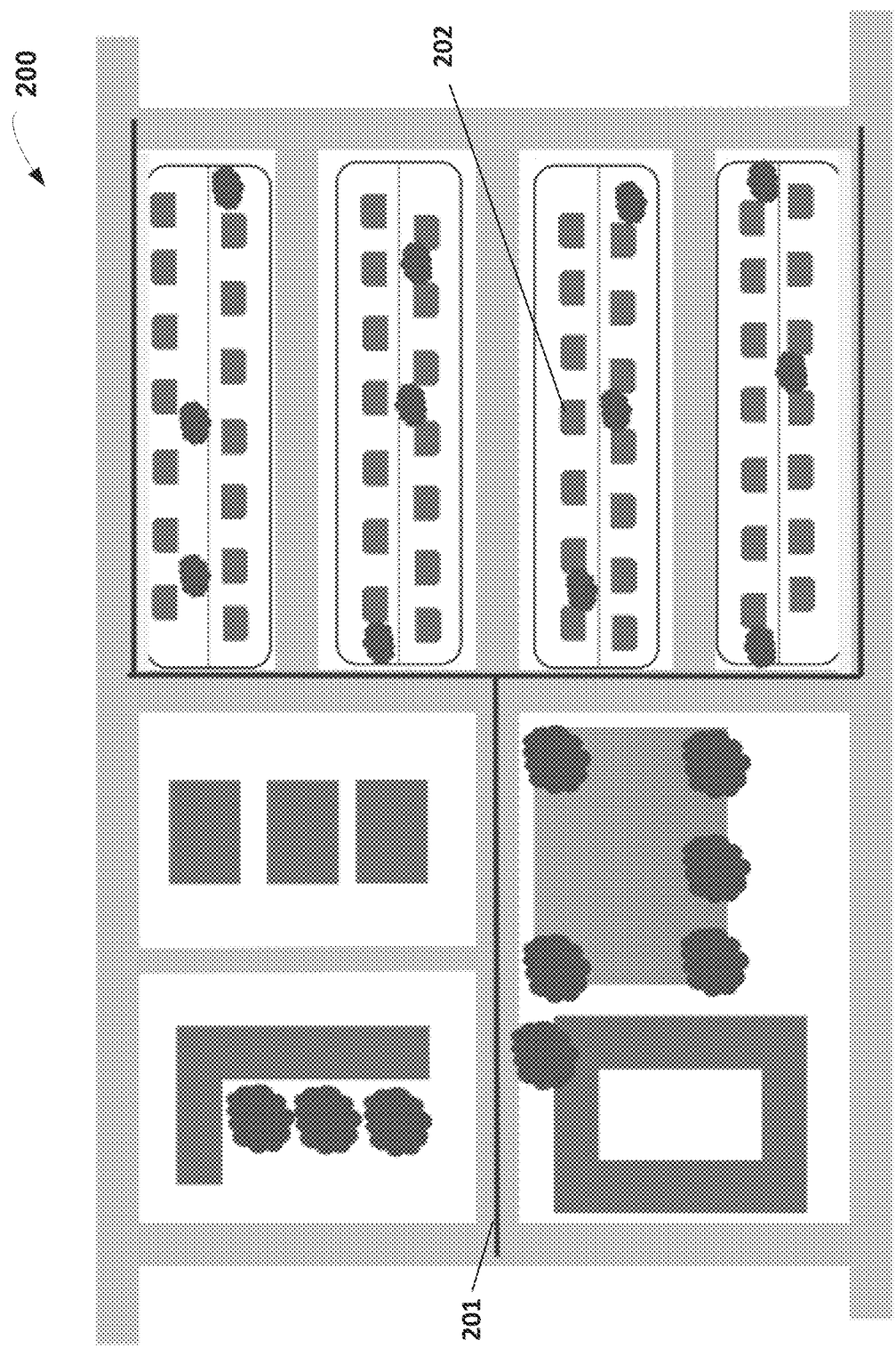
FIG. 2 depicts another example diagram of a neighborhood comprising a fiber network, in accordance with various aspects of this disclosure.

Turning to FIG. 2, example neighborhood 200 is shown that is similar to neighborhood 100 of FIG. 1. For instance, as shown, neighborhood 200 comprises a fiber network that includes fiber links along the streets of neighborhood 200 (e.g., fiber link 201). In one example scenario, the fiber network may be extended to a residential property unit, such as home 202, to connect home 202 to the fiber network and provide high-speed internet to home 202. Generally speaking, the fiber network may be extended to home 202 for various reasons.

As one example, the fiber network may be extended to home 202 at the request of the dwellers of home 202 who may have subscribed to services of the fiber network (e.g., high-speed internet service). As another example, the fiber network may be extended to home 202 because home 202 may have been selected by a wireless mesh network operator as a wired or wireless mesh communication node with backhaul connectivity. The fiber network may be extended to home 202 for various other reasons as well.

It should be understood that the fiber network can be extended to other residential property units in neighborhood 200 (e.g., a home located near the corner of a street or near the middle of the street) or other types of property (e.g., a commercial property) in neighborhood 200.

The process to extend the fiber network to home 202 to connect home 202 to the fiber network may take various forms. For instance, this process may begin with identifying the most convenient location on the fiber network in the neighborhood, which may correspond to a location that is easiest to splice a new fiber link into an existing fiber link of the fiber network to extend the new fiber link to home 202 and connect home 202 to the fiber network. This most convenient location on the fiber network may be located in various parts of a given neighborhood.

Figure 3:
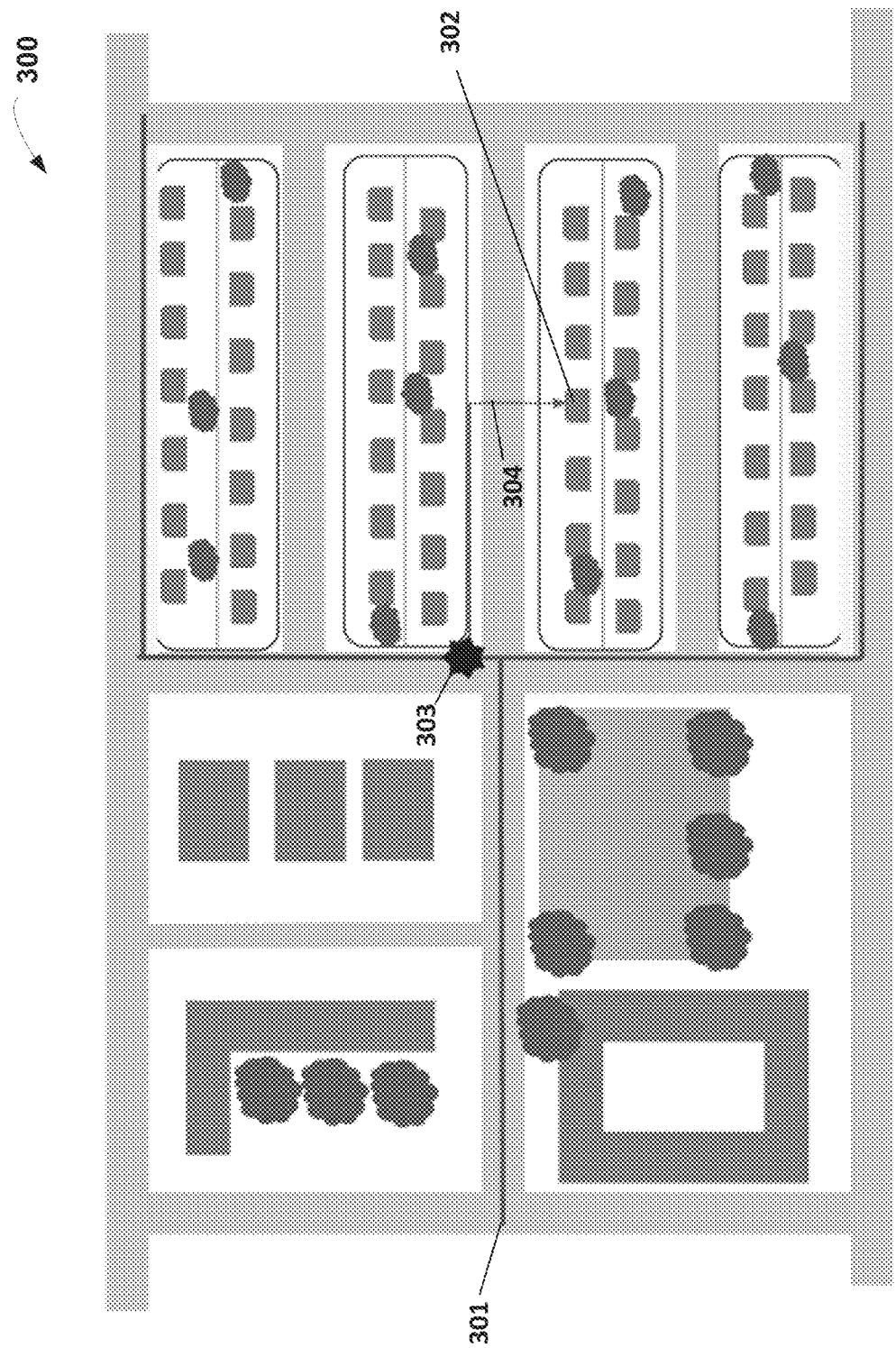
FIG. 3 depicts an example diagram of a neighborhood comprising a fiber network and a fiber access point, in accordance with various aspects of this disclosure.

To illustrate one example, FIG. 3 depicts an example neighborhood 300 that is similar to neighborhood 100 of FIG. 1. For instance, neighborhood 300 may comprise a fiber network that includes fiber links along the streets of neighborhood 300 (e.g., fiber link 301). In an example scenario, the fiber network may need to be extended to home 302 to connect home 302 to the fiber network and provide high-speed internet to home 302.

As further shown in FIG. 3, neighborhood 300 also includes most convenient location 303 on the fiber network in neighborhood 300 that may correspond to a location that is easiest to splice a new fiber link into an existing fiber link (e.g., fiber link 301) of the fiber network to extend the new fiber link to home 302 and connect home 302 to the fiber network. In one embodiment, most convenient location 303 may be located at a fiber access point on the fiber network in neighborhood 300. The location of the fiber access point may correspond to the location that is easiest to splice a new fiber link into an existing fiber link since no ground digging may be required to splice the new fiber link into the existing fiber link. The fiber network may then be extended to home 302 by digging the ground from the location of the fiber access point (e.g., most convenient location 303) to home 302 and deploying fiber link 304 between the fiber access point and home 302.

Generally speaking, the cost of deploying link 304 between the fiber access point and home 302 may depend on the length of link 304 and/or different city and/or municipality permits that may be required (e.g., to dig the ground). Accordingly, the cost of deploying link 304 may vary depending on the specific route between most convenient location 303 and home 302 (which may depend on the specific layout of neighborhood 300) and regulations for neighborhood 300.

The most convenient location on a fiber network in a neighborhood, which may correspond to a location that is easiest to splice a new fiber link into an existing fiber link of the fiber network may be located in other parts of the neighborhood as well.

Figure 4:
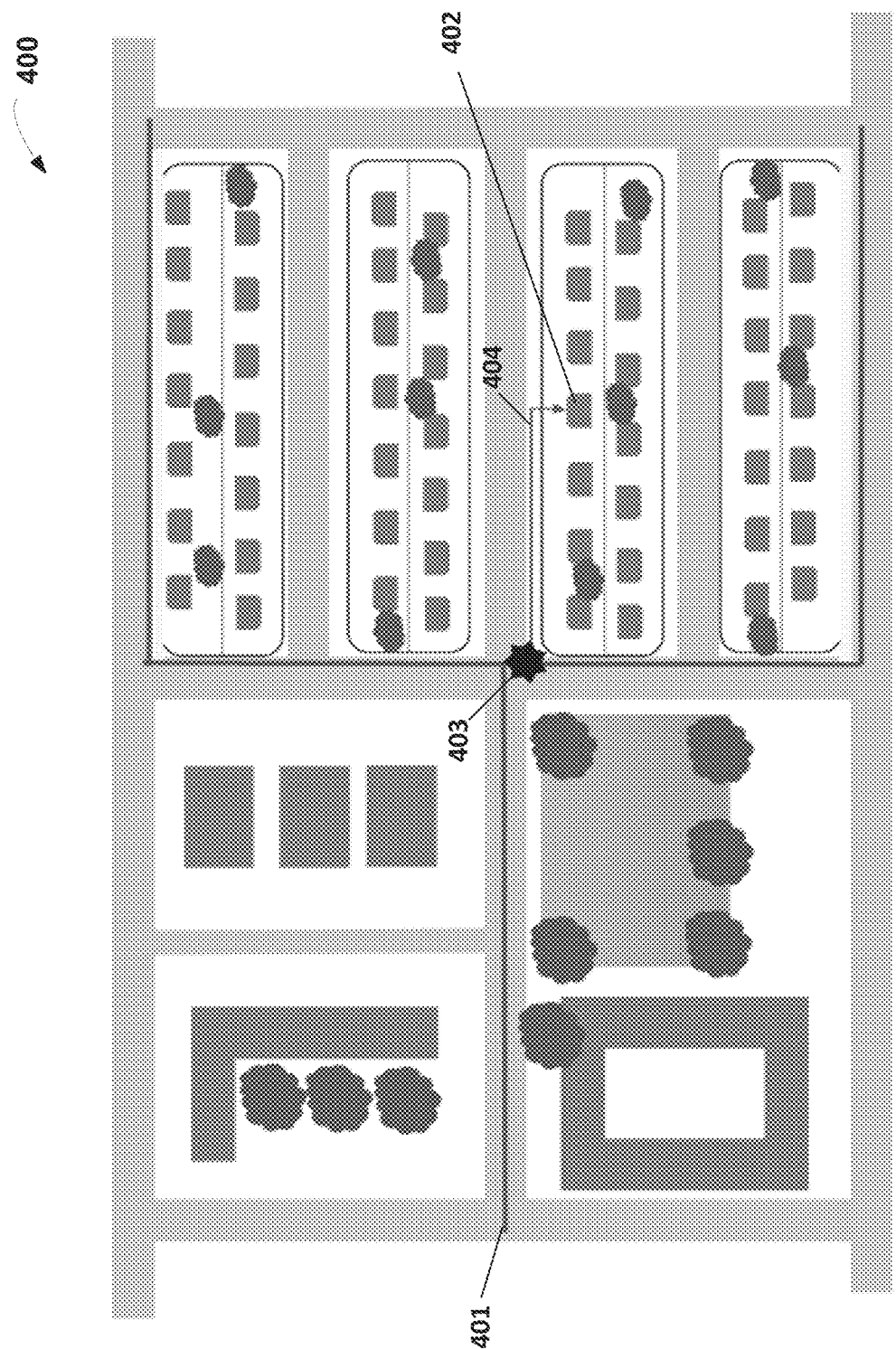
FIG. 4 depicts an example diagram of a neighborhood comprising a fiber network and a fiber splice point, in accordance with various aspects of this disclosure.

To illustrate another example, FIG. 4 depicts an example neighborhood 400 that is similar to neighborhood 100 of FIG. 1. For instance, neighborhood 400 may comprise a fiber network that includes fiber links along the streets of neighborhood 400 (e.g., fiber link 401). In an example scenario, the fiber network may need to be extended to home 402 to connect home 402 to the fiber network and provide high-speed internet to home 402.

As further shown in FIG. 4, neighborhood 400 also includes most convenient location 403 on the fiber network in neighborhood 400 that may correspond to a location that is easiest to splice a new fiber link into an existing fiber link (e.g., fiber link 401) of the fiber network to extend the new fiber link to home 402 and connect home 402 to the fiber network. In one embodiment, most convenient location 403 may be located at a fiber splicing point on the fiber network in neighborhood 400. The location of the fiber splicing point may correspond to the location that is easiest to splice a new fiber link into an existing fiber link since no ground digging may be required to splice the new fiber link into the existing fiber link. The fiber network may then be extended to home 402 by digging the ground from the location of the fiber splicing point (e.g., most convenient location 403) to home 402 and deploying fiber link 404 between the fiber splicing point and home 402.

In line with the discussion above, the cost of deploying link 404 between the fiber splicing point and home 402 may depend on the length of link 404 and/or different city and/or municipality permits that may be required (e.g., to dig the ground). Accordingly, the cost of deploying link 404 may vary depending on the specific route between most convenient location 403 and home 402 (which may depend on the specific layout of neighborhood 400) and regulations for neighborhood 400.

Figure 5:
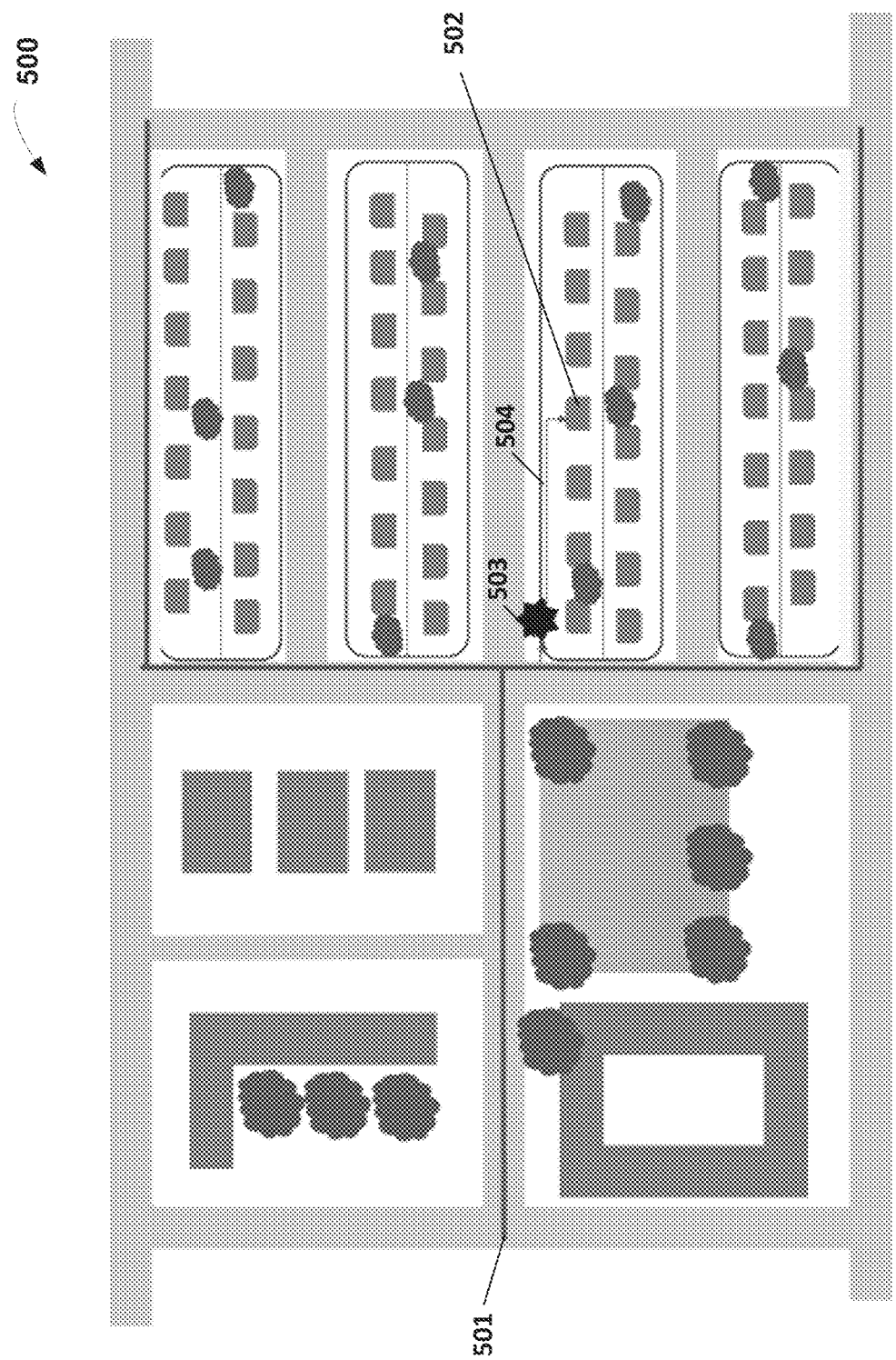
FIG. 5 depicts an example diagram of a neighborhood comprising a fiber network and a conduit, in accordance with various aspects of this disclosure.

To illustrate another example of a most convenient location on a fiber network in a neighborhood, FIG. 5 depicts an example neighborhood 500 that is similar to neighborhood 100 of FIG. 1. For instance, neighborhood 500 may comprise a fiber network that includes fiber links along the streets of neighborhood 500 (e.g., fiber link 501). In an example scenario, the fiber network may need to be extended to home 502 to connect home 502 to the fiber network and provide high-speed internet to home 502.

As further shown in FIG. 5, neighborhood 500 also includes most convenient location 503 on the fiber network in neighborhood 500 that may correspond to a location that is easiest to splice a new fiber link into an existing fiber link (e.g., fiber link 501) of the fiber network to extend the new fiber link to home 502 and connect home 502 to the fiber network. In one embodiment, most convenient location 503 may be located at an underground utility conduit (e.g., an electric conduit or any other type of conduit capable of carrying a fiber link) either on the fiber network or in close proximity to the fiber network in neighborhood 500. The location of the conduit may correspond to the location that is easiest to splice a new fiber link into an existing fiber link without digging the ground. The fiber network may then be extended to home 502 by digging the ground from the location of the conduit (e.g., most convenient location 503) to home 502 and deploying fiber link 504 between the conduit and home 502.

In line with the discussion above, the cost of deploying link 504 between the conduit and home 502 may depend on the length of link 504 and/or different city and/or municipality permits that may be required (e.g., to dig the ground). Accordingly, the cost of deploying link 504 may vary depending on the specific route between most convenient location 503 and home 502 (which may depend on the specific layout of neighborhood 500) and regulations for neighborhood 500.

Figure 6:
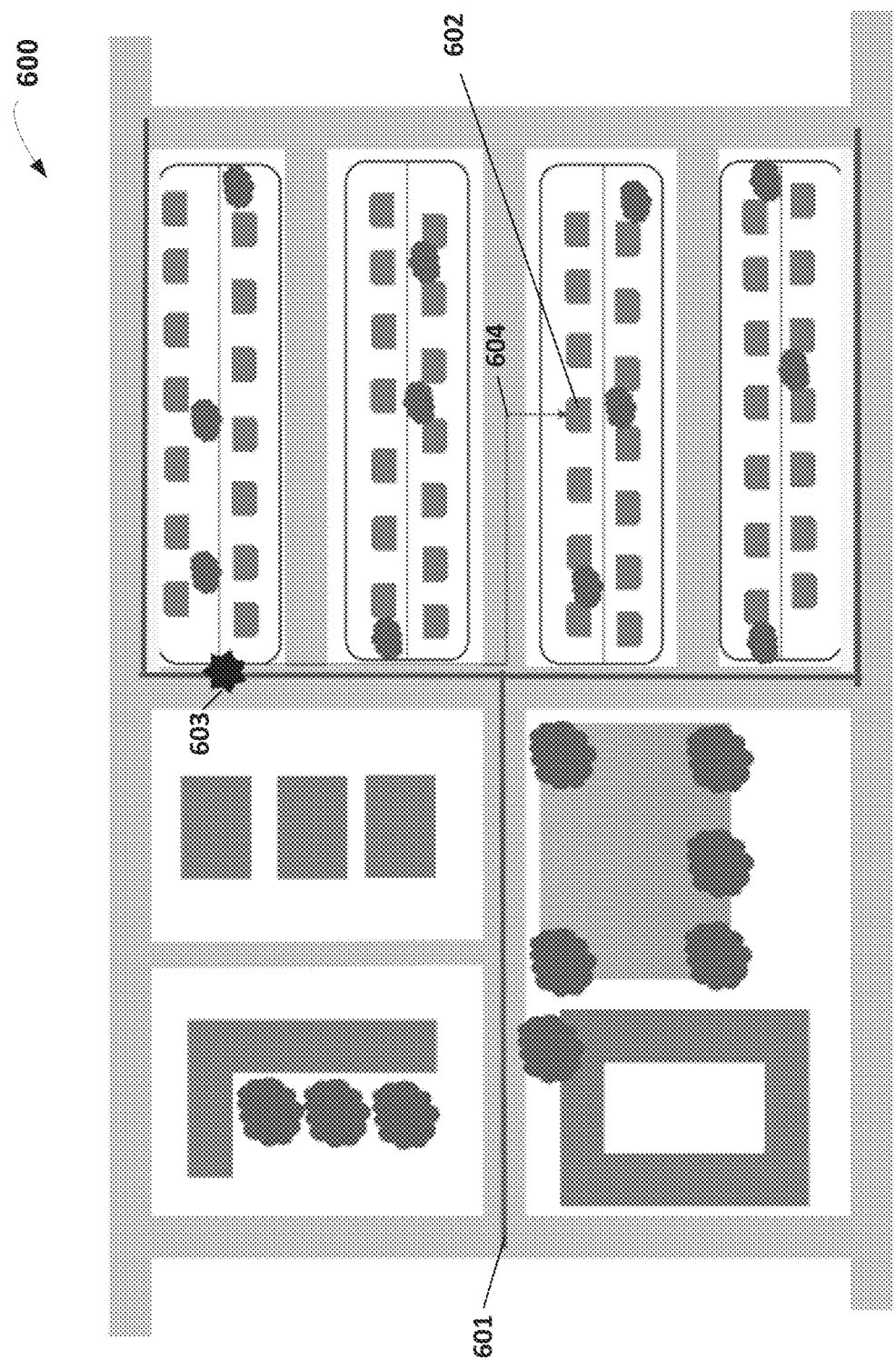
FIG. 6 depicts an example diagram of a neighborhood comprising a fiber network and an aerial fiber link, in accordance with various aspects of this disclosure.

To illustrate yet another example of a most convenient location on a fiber network in a neighborhood, FIG. 6 depicts an example neighborhood 600 that is similar to neighborhood 100 of FIG. 1. For instance, neighborhood 600 may comprise a fiber network that includes fiber links along the streets of neighborhood 600 (e.g., fiber link 601). In an example scenario, the fiber network may need to be extended to home 602 to connect home 602 to the fiber network and provide high-speed internet to home 602.

As further shown in FIG. 6, neighborhood 600 also includes most convenient location 603 on the fiber network in neighborhood 600 that may correspond to a location that is easiest to splice a new fiber link into an existing fiber link (e.g., fiber link 601) of the fiber network to extend the new fiber link to home 602 and connect home 602 to the fiber network. In one embodiment, most convenient location 603 may be located in close proximity to an aerial fiber link on the fiber network in neighborhood 600. This location in close proximity to the aerial fiber link may correspond to the location that is easiest to splice a new fiber link into an existing fiber link without digging the ground. The fiber network may then be extended to home 602 by digging the ground from most convenient location 603 to home 602 and deploying fiber link 604 between most convenient location 603 and home 602.

The most convenient location on a fiber network in a neighborhood, which may correspond to a location that is easiest to splice a new fiber link into an existing fiber link of the fiber network may be located in other parts of the neighborhood as well.

In line with the discussion above, the method for extending a fiber network to a property (e.g., a residential property unit) to connect the property to the fiber network may take various forms. One example will now be described with reference to method 700 of FIG. 7.

For the purposes of illustration only, it should be understood that the example functions involved in method 700 are merely described in such manner for the sake of clarity and explanation and some functions may be carried out in various other manners as well, including the possibility that example functions may be added, removed, rearranged into different orders, grouped together, and/or not grouped together at all.

Figure 7:
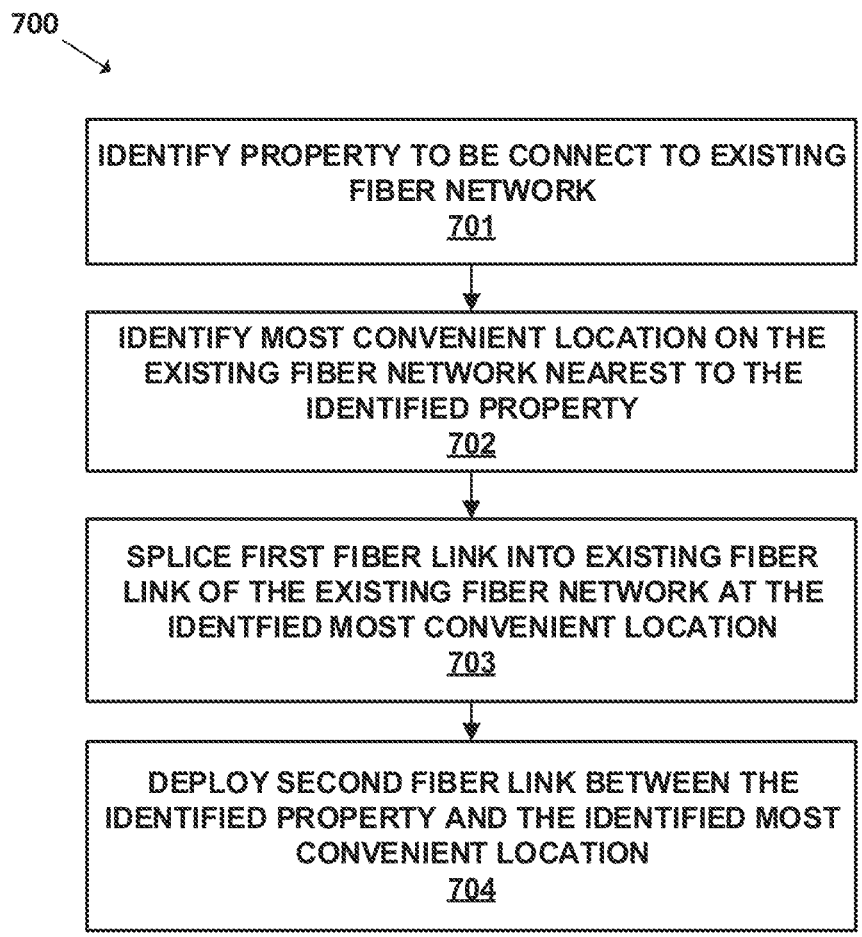
FIG. 7 depicts an example flow diagram for connecting a property to an existing fiber network of a neighborhood, in accordance with various aspects of this disclosure.

As shown in FIG. 7, at block 701, method 700 may involve identifying a property to be connected to an existing fiber network. The property to be connected to the existing fiber network may be identified in various manners.

For example, in line with the discussion above, identifying the property to be connected to an existing fiber network may involve identifying a dweller of the property that has subscribed to a service of the fiber network. For instance, referring back to FIG. 3, home 302 may be identified as the property to be connected to the existing fiber network, which may involve identifying a dweller of home 302 that has subscribed to a high-speed internet service of the fiber network. As another example, identifying the property to be connected to an existing fiber network may involve identifying a property that has been selected by a wireless mesh network operator as a wired or wireless mesh communication node with backhaul connectivity. The property to be connected to the existing fiber network may be identified in various other manners as well.

Further, while block 701 has been described with reference to identifying a single property that is to be connected to an existing fiber network, it should be understood that block 701 may involve identifying multiple properties that are to be connected to the existing fiber network.

At block 702, method 700 may then involve identifying a most convenient location on the existing fiber network nearest to the identified property. In line with the discussion above, the most convenient location on the existing fiber network may be located in various parts of a given neighborhood in which the property is situated. As one example, referring back to FIG. 3, the most convenient location may be located at a fiber access point on the fiber network that is nearest to home 302 in neighborhood 300. As another example, referring back to FIG. 4, the most convenient location may be located at a fiber splice point on the fiber network that is nearest to home 402 in neighborhood 400. As yet another example, referring back to FIG. 5, the most convenient location may be located at an underground utility conduit either near or on the fiber network that is in close proximity to home 502 in neighborhood 500. As a further example, referring back to FIG. 6, the most convenient location may be located in close proximity to an aerial fiber link on the fiber network that is nearest to home 602 in neighborhood 600. The most convenient location on the existing fiber network may be located in various other parts of a given neighborhood as well.

At block 703, method 700 may then involve splicing a first fiber link into an existing fiber link of the existing fiber network at the identified most convenient location in order to extend the first fiber link to the property and connect the property to the fiber network. For instance, referring back to FIG. 6, a first fiber link may be spliced into an existing fiber link (e.g., fiber link 601) of the fiber network at most convenient location 603 in neighborhood 600 without digging the ground of neighborhood 600. One of ordinary skill in the art will appreciate that the first fiber link may be spliced into the existing fiber link in various manners.

In turn, at block 704, method 700 may involve deploying a second fiber link between the identified property and the identified most convenient location. For instance, as noted above, the fiber network in neighborhood 600 may be extended to home 602 by digging the ground of neighborhood 600 from most convenient location 603 to home 602 and deploying fiber link 604 between most convenient location 603 and home 602.

It should be understood that method 700 may take various other forms. It should also be understood that some functions of method 700 could be facilitated at least in part by computing systems associated with the entities providing the fiber network services. In this respect, each such computing system may comprise one or more processors, data storage, and program instructions that are executable to cause the computing systems to carry out some of the functions described above (e.g., block 701 and/or block 702).

Although method 700 of FIG. 7 has many advantages in terms of reduction of cost and time required to connect a property to an existing fiber network of a neighborhood, method 700 can still be costly depending on the distance between the property that is to be connected to the existing fiber network and the most convenient location on the existing fiber network for fiber link splicing. However, in certain scenarios where there may be some flexibility in choosing the property that is to be connected to the existing fiber network, the method for connecting a property to an existing fiber network can be improved to further reduce both time and cost. This method may take various forms and may be carried out in various manners.

Figure 8:
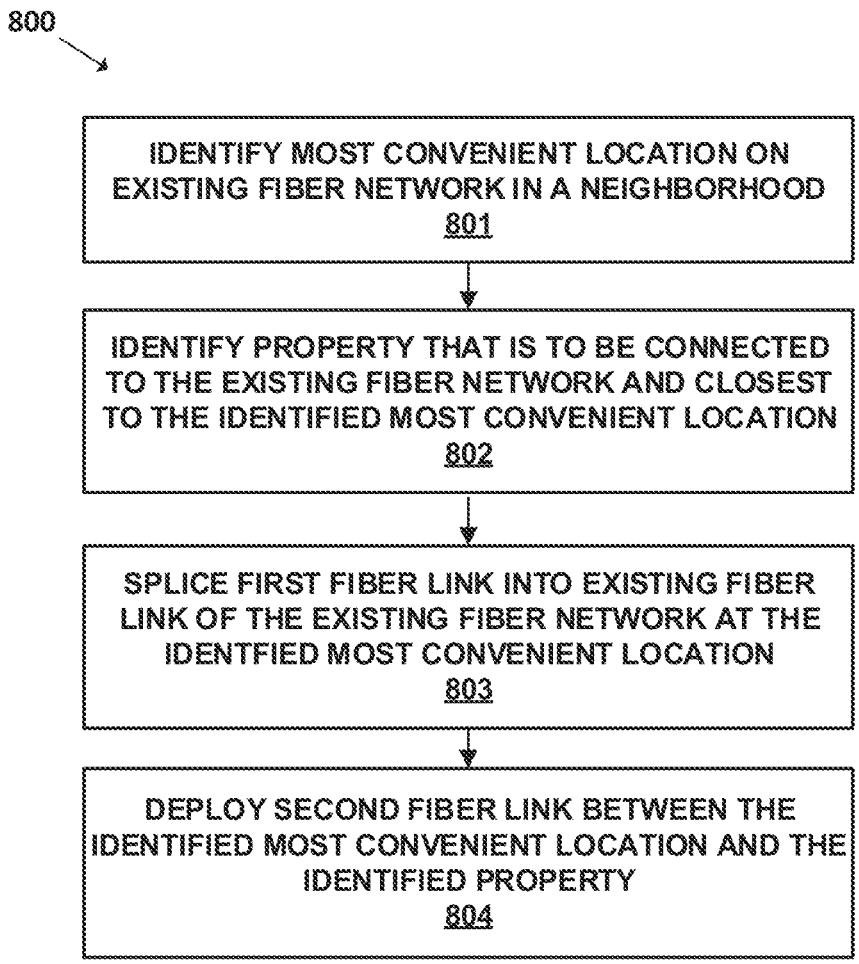
FIG. 8 depicts another example flow diagram for connecting a property to an existing fiber network of a neighborhood, in accordance with various aspects of this disclosure.

One example will now be described with reference to method 800 of FIG. 8. For the purposes of illustration only, it should be understood that the example functions involved in method 800 are merely described in such manner for the sake of clarity and explanation and some functions may be carried out in various other manners as well, including the possibility that example functions may be added, removed, rearranged into different orders, grouped together, and/or not grouped together at all.

At block 801, method 800 may involve identifying a most convenient location on an existing fiber network in a neighborhood. The most convenient location on the existing fiber network may be located in various parts of the neighborhood. As one example, referring back to FIG. 3, the most convenient location may be located at a fiber access point on the fiber network in neighborhood 300. As another example, referring back to FIG. 4, the most convenient location may be located at a fiber splice point on the fiber network in neighborhood 400. As yet another example, referring back to FIG. 5, the most convenient location may be located at an underground utility conduit either near or on the fiber network in neighborhood 500. As a further example, referring back to FIG. 6, the most convenient location may be located in close proximity to an aerial fiber link on the fiber network in neighborhood 600. The most convenient location on the existing fiber network may be located in various other parts of the neighborhood as well.

At block 802, method 800 may then involve identifying a property that is to be connected to the existing fiber network and closest to the identified most convenient location. Generally speaking, a property that is closest to the identified most convenient location may correspond to a location where the length of fiber link between the property and the most convenient location is the shortest. The property that is to be connected to the existing fiber network and closest to the identified most convenient location may be identified in various manners.

For example, in line with the discussion above, identifying the property that is to be connected to an existing fiber network and closest to the identified most convenient location may involve identifying a dweller of a given property that has subscribed to a service of the fiber network and is closest to the identified most convenient location. For instance, referring back to FIG. 3, home 302 may be identified as the property to be connected to the existing fiber network, which may involve identifying a dweller of home 302 that has subscribed to a high-speed internet service of the fiber network. Assuming that the other homes that are closer to most convenient location 303 (e.g., the homes to the left of home 302 on the same row) are not to be connected to the existing fiber network, home 302 is the closest home to most convenient location 303 that is to be connected to the existing fiber network.

As another example, identifying the property that is to be connected to an existing fiber network and closest to the identified most convenient location may involve identifying a property that has been selected by a wireless mesh network operator as a wired or wireless mesh communication node with backhaul connectivity and that is also closest to the identified most convenient location (e.g., most convenient location 303 of FIG. 3).

The property that is to be connected to the existing fiber network and closest to the identified most convenient location may be identified in various other manners as well.

Further, in line with the discussion above, while block 802 has been described with reference to identifying a single property that is to be connected to the existing fiber network and closest to the identified most convenient location, it should be understood that block 802 may involve identifying multiple properties that are to be connected to the existing fiber network, where each property is close to the identified most convenient location.

At block 803, method 800 may involve splicing a first fiber link into an existing fiber link of the existing fiber network at the identified most convenient location in order to extend the first fiber link to the property and connect the property to the fiber network. For instance, referring back to FIG. 6, a first fiber link may be spliced into an existing fiber link (e.g., fiber link 601) of the fiber network at most convenient location 603 in neighborhood 600 without digging the ground of neighborhood 600. One of ordinary skill in the art will appreciate that the first fiber link may be spliced into the existing fiber link in various manners.

In turn, at block 804, method 800 may involve deploying a second fiber link between the identified most convenient location and the identified property. For instance, as noted above, the fiber network in neighborhood 600 may be extended to home 602 by digging the ground of neighborhood 600 from most convenient location 603 to home 602 and deploying fiber link 604 between most convenient location 603 and home 602.

It should be understood that method 800 may take various other forms. It should also be understood that some functions of method 800 could be facilitated at least in part by computing systems associated with the entities providing the fiber network services. In this respect, each such computing system may comprise one or more processors, data storage, and program instructions that are executable to cause the computing systems to carry out some of the functions described above (e.g., block 801 and/or block 802).

In accordance with the present disclosure, in line with the discussion above, the location of a property that is connected to an existing fiber network in a neighborhood may be used to build a wireless communication mesh network. For instance, the location of the property that is connected to the existing fiber network may be used as a seed node of a wireless communication mesh network with backhaul connectivity through the existing fiber network and originate one or more ptp and/or ptmp communication links from that location.

In some instances, a subset of locations of properties that are each connected to an existing fiber network in a neighborhood may be used to build a wireless communication mesh network. For instance, a subset of locations of properties that are connected to the existing fiber network may be used as seed nodes of a wireless communication mesh network with backhaul connectivity through the existing fiber network, where the location of each seed node may correspond to a location that is close to the most convenient location in accordance with the examples discussed above. Each seed node may then originate one or more ptp and/or ptmp communication links.

In one particular example, grocery store locations may be identified based on their proximity to a most convenient location on an existing fiber network. A subset of these identified grocery store locations may then be used as seed nodes of a wireless communication mesh network with backhaul connectivity through the existing fiber network and each of these grocery store locations in the subset may originate one or more ptp and/or ptmp communication links (e.g., from the roof of each grocery store location in the subset, where the roof comprises multiple ptp and/or ptmp radios)

Figure 9:
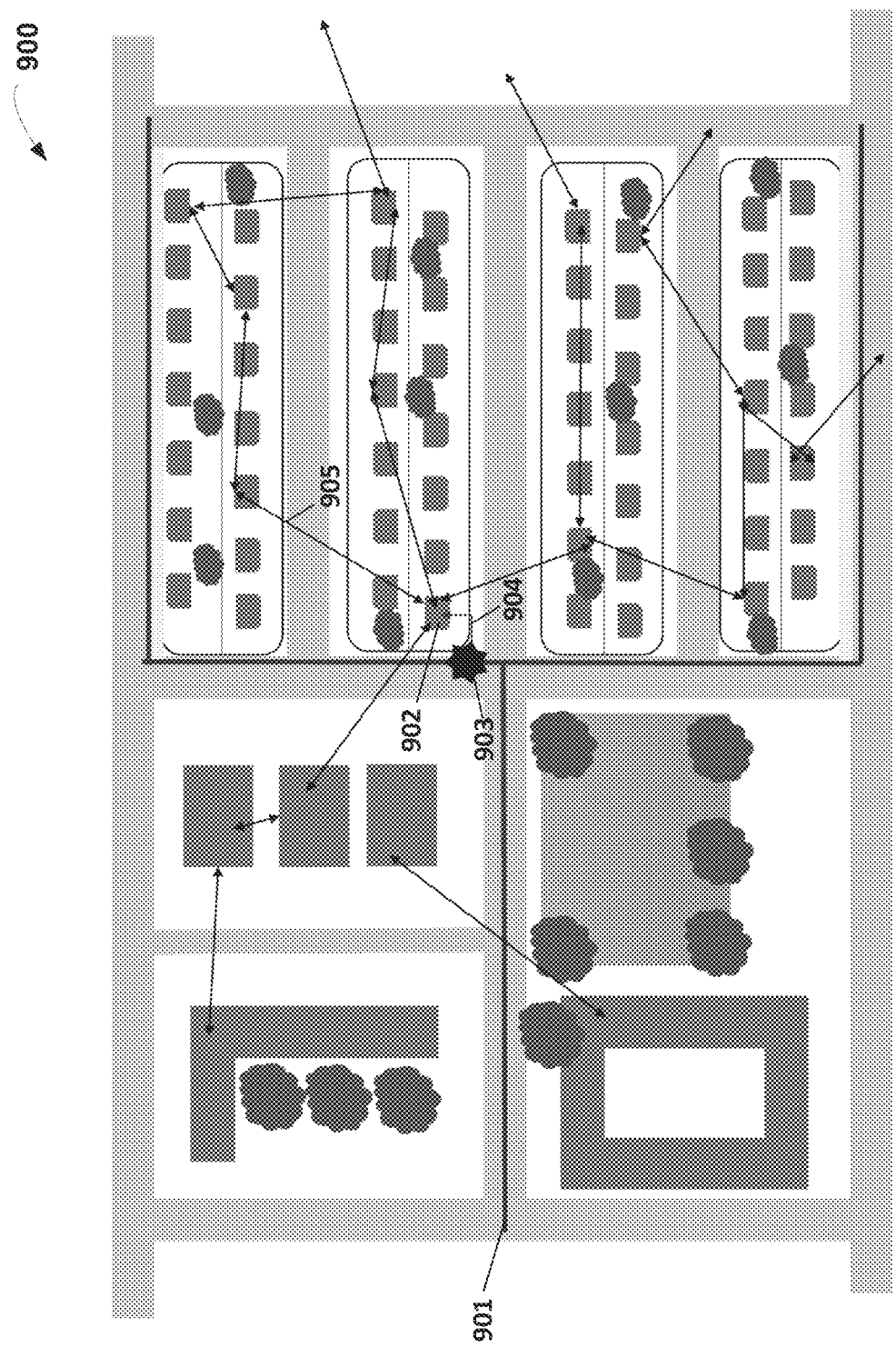
FIG. 9 depicts another example diagram of a neighborhood comprising a fiber network and a fiber access point, in accordance with various aspects of this disclosure.

To illustrate an example of a wireless communication mesh network that may be created, FIG. 9 depicts an example neighborhood 900 that is similar to neighborhood 300 of FIG. 3. For instance, neighborhood 900 may comprise a fiber network that includes fiber links along the streets of neighborhood 900 (e.g., fiber link 901). In an example scenario, the fiber network may need to be extended to home 902 to connect home 902 to the fiber network and provide high-speed internet to home 902.

As further shown in FIG. 9, neighborhood 900 also includes most convenient location 903 on the fiber network in neighborhood 900 that may correspond to a location that is easiest to splice a new fiber link into an existing fiber link (e.g., fiber link 301) of the fiber network. In one embodiment, most convenient location 903 may be located at a fiber access point on the fiber network in neighborhood 900. The location of the fiber access point may correspond to the location that is easiest to splice a new fiber link into an existing fiber link without digging the ground.

A property may then be identified that is closest to most convenient location 903 (e.g., home 902), which may correspond to a location where the length of fiber link 904 between the property and most convenient location 903 is the shortest. However, it should be understood that another property may be identified that may not necessarily correspond to a location where the length of fiber link 904 between the property and most convenient location 903 is the shortest.

In turn, the fiber network in neighborhood 900 may be extended to the identified property that is closest to most convenient location 903 (e.g., home 902) by digging the ground from the location of the fiber access point (e.g., most convenient location 903) to home 902 and deploying fiber link 904 between the fiber access point and home 902.

Generally speaking, in line with the discussion above, the cost of deploying fiber link 904 between the fiber access point and home 902 may depend on the length of fiber link 904 and/or different city and/or municipality permits that may be required (e.g., to dig the ground). However, given that fiber link 904 is relatively short (due to the close proximity of home 902 and most convenient location 903), the cost may be significantly less than deploying fiber link 304 of FIG. 3 between home 302 and most convenient location 303.

As further shown in FIG. 9, once home 902 is connected to the fiber network in neighborhood 900, home 902 may be used as a seed node of a wireless communication mesh network with backhaul connectivity through the existing fiber network and multiple ptp or ptmp communication links (e.g., communication link 905) may originate from home 902 to create the wireless communication mesh network.

In general, the ptp and/or ptmp communication links that may originate from home 902 may operate on various physical layer wireless communication protocols, such as 1G, 2G, 3G, 4G LTE, 4G WiMAX, 5G NR, 6G, 7G, Wi-Fi 802.11 ac/ad/ay etc. These ptp and/or ptmp communication links may also operate over a variety of different frequencies ranging from 600 MHz to the millimeter wave spectrum (e.g., 28-34 GHZ, 60 GHz, 70 GHZ, and/or 90/95 GHz bands and beyond).

Figure 10:
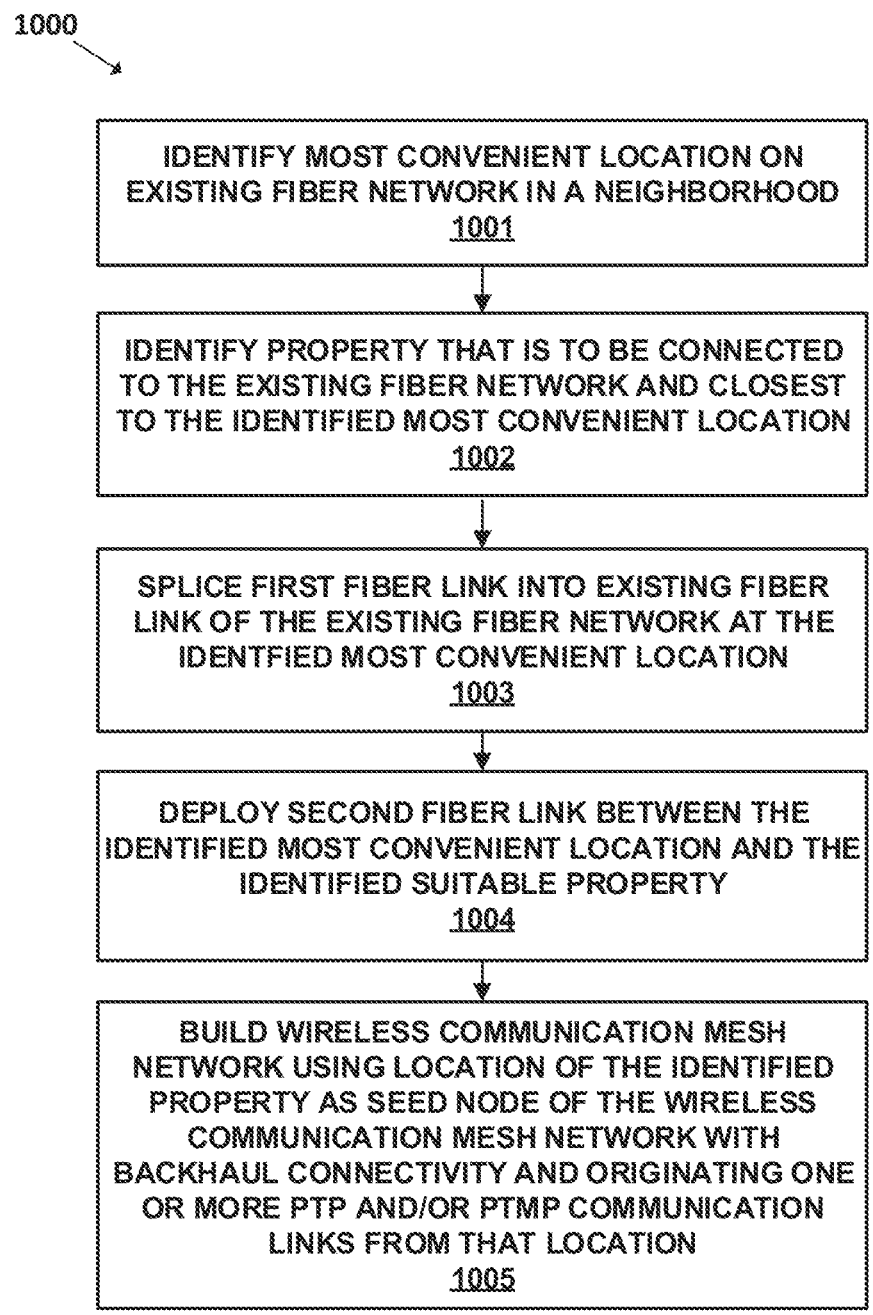
FIG. 10 depicts an example flow diagram for building a wireless communication mesh network, in accordance with various aspects of this disclosure.

In line with the discussion above, the method for building a wireless communication mesh network using a location of a property that is connected to an existing fiber network in a neighborhood may take various forms. One example will now be described with reference to method 1000 of FIG. 10.

For the purposes of illustration only, it should be understood that the example functions involved in method 1000 are merely described in such manner for the sake of clarity and explanation and some functions may be carried out in various other manners as well, including the possibility that example functions may be added, removed, rearranged into different orders, grouped together, and/or not grouped together at all.

At block 1001, method 1000 may involve identifying a most convenient location on an existing fiber network in a neighborhood. In line with the discussion above with reference to block 801 of FIG. 8, the most convenient location on the existing fiber network may be located in various parts of the neighborhood.

At block 1002, method 1000 may involve identifying a property that is to be connected to the existing fiber network and closest to the identified most convenient location. The property that is to be connected to the existing fiber network and closest to the identified most convenient location may be identified in various manners described above with reference to block 802 of FIG. 8. Further, in line with the discussion above, it should be understood that, in some instances, block 1002 may involve identifying multiple properties that are to be connected to the existing fiber network, where each property is close to the identified most convenient location.

At block 1003, method 1000 may then involve splicing a first fiber link into an existing fiber link of the existing fiber network at the identified most convenient location in order to extend the first fiber link to the property and connect the property to the fiber network. For instance, referring back to FIG. 6, a first fiber link may be spliced into an existing fiber link (e.g., fiber link 601) of the fiber network at most convenient location 603 in neighborhood 600 without digging the ground of neighborhood 600. One of ordinary skill in the art will appreciate that the first fiber link may be spliced into the existing fiber link in various manners.

At block 1004, method 1000 may then involve deploying a second fiber link between the identified most convenient location and the identified property. For instance, as noted above, the fiber network in neighborhood 600 may be extended to home 602 by digging the ground of neighborhood 600 from most convenient location 603 to home 602 and deploying fiber link 604 between most convenient location 603 and home 602.

In turn, at block 1005, method 1000 may involve building a wireless communication mesh network using the location of the identified property as a seed node of the wireless communication mesh network with backhaul connectivity through the existing fiber network and originating one or more ptp and/or ptmp communication links from the location of the identified property. For instance, with reference to FIG. 9, a wireless communication mesh network may be built in neighborhood 900 by using the location of home 902 as a seed node of the wireless communication mesh network with backhaul connectivity through the fiber network in neighborhood 900. As shown in FIG. 9, one or more ptp and/or ptmp communication links (e.g., communication link 905) may originate from the location of home 902.

It should be understood that method 1000 may take various other forms. It should also be understood that some functions of method 1000 could be facilitated at least in part by computing systems associated with the entities providing the fiber network services. In this respect, each such computing system may comprise one or more processors, data storage, and program instructions that are executable to cause the computing systems to carry out some of the functions described above (e.g., block 1001, block 1002, and/or block 1005).

For instance, in a scenario where multiple properties have been identified at block 1002, at block 1005, method 1000 involve a computing system facilitating the selection of a subset of the identified properties based on various factors, examples of which may include the height of each identified property, the density of residential properties near each identified property, and/or the elevation profile of the area where each identified property is located, among other possible factors. The respective location of each property in the subset may then be used as a seed node of the wireless communication mesh network with backhaul connectivity through the fiber network in neighborhood 900 and originate of one or more ptp and/or ptmp communication links from the respective location.

Figure 11:
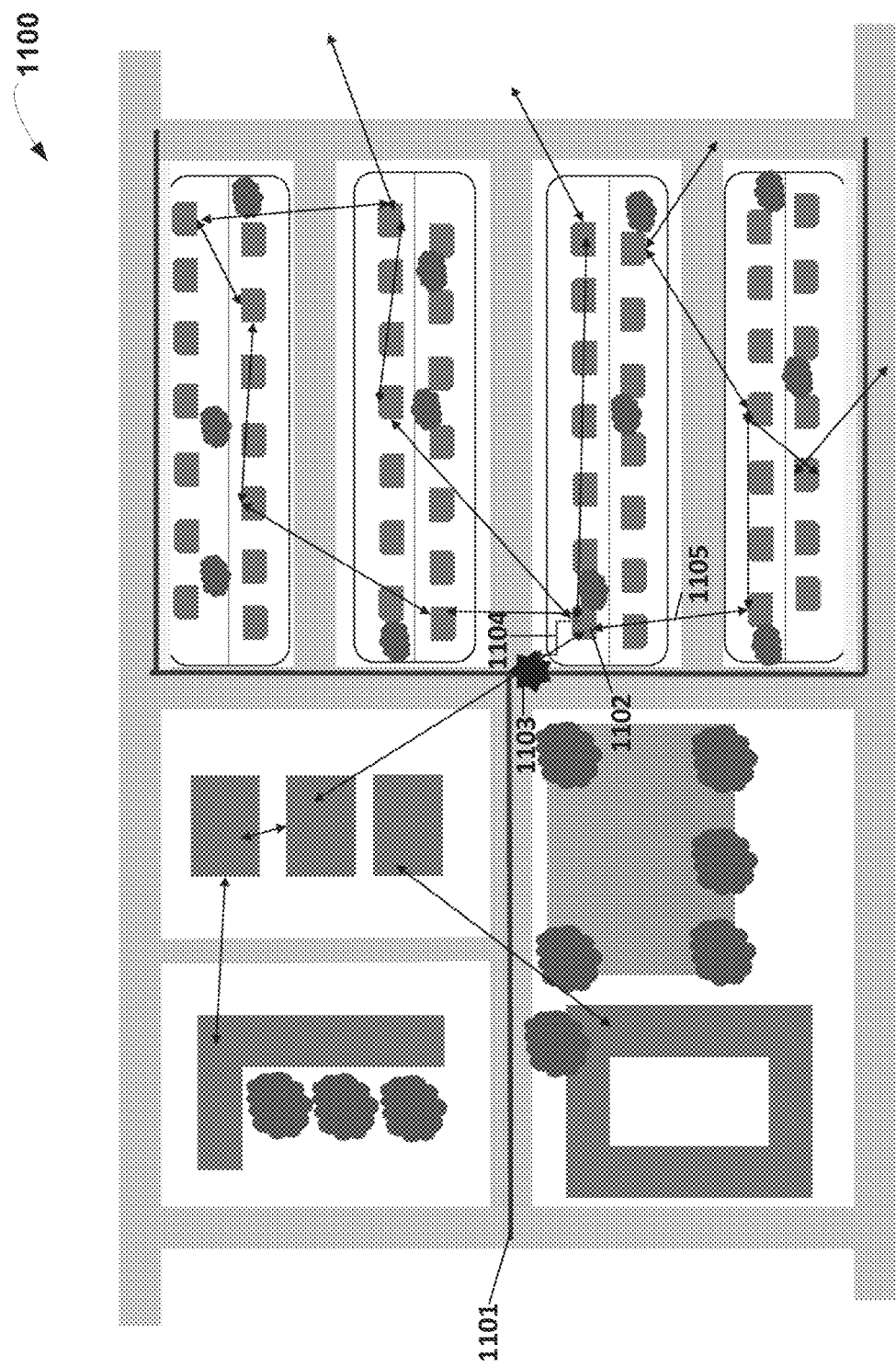
FIG. 11 depicts another example diagram of a neighborhood comprising a fiber network and a fiber splice point, in accordance with various aspects of this disclosure.

Turning to FIG. 11, an example neighborhood 1100 is shown that is similar to neighborhood 400 of FIG. 4. For instance, neighborhood 1100 may comprise a fiber network that includes fiber links along the streets of neighborhood 1100 (e.g., fiber link 1101). In an example scenario, the fiber network may need to be extended to home 1102 to connect home 1102 to the fiber network and provide high-speed internet to home 1102.

As further shown in FIG. 11, neighborhood 1100 also includes most convenient location 1103 on the fiber network in neighborhood 1100 that may correspond to a location that is easiest to splice a new fiber link into an existing fiber link (e.g., fiber link 1101) of the fiber network. In one embodiment, most convenient location 1103 may be located at a fiber splice point on the fiber network in neighborhood 1100. The location of the fiber splice point may correspond to the location that is easiest to splice a new fiber link into an existing fiber link without digging the ground (or with minimal digging).

A property may then be identified that is closest to most convenient location 1103 (e.g., home 1102), which may correspond to a location where the length of fiber link 1104 between the property and most convenient location 1103 is the shortest. However, it should be understood that another property may be identified that may not necessarily correspond to a location where the length of fiber link 1104 between the property and most convenient location 1103 is the shortest.

In turn, the fiber network in neighborhood 1100 may be extended to the identified property that is closest to most convenient location 1103 (e.g., home 1102) by digging the ground from the location of the fiber splice point (e.g., most convenient location 1103) to home 1102 and deploying fiber link 1104 between the fiber access point and home 1102.

Generally speaking, in line with the discussion above, the cost of deploying fiber link 1104 between the fiber access point and home 1102 may depend on the length of link 1104 and/or different city and/or municipality permits that may be required (e.g., to dig the ground). However, given that fiber link 1104 is relatively short (due to the close proximity of home 1102 and most convenient location 1103), the cost may be significantly less than deploying fiber link 404 of FIG. 4 between home 402 and most convenient location 403.

As further shown in FIG. 11, once home 1102 is connected to the fiber network in neighborhood 1100, home 1102 may be used as a seed node of a wireless communication mesh network with backhaul connectivity through the existing fiber network and multiple ptp or ptmp communication links (e.g., communication link 1105) may originate from home 1102 to create the wireless communication mesh network.

In general, the ptp and/or ptmp communication links that may originate from home 1102 may operate on various physical layer wireless communication protocols, such as 1G, 2G, 3G, 4G LTE, 4G WiMAX, 5G NR, 6G, 7G, Wi-Fi 802.11 ac/ad/ay etc. These ptp and/or ptmp communication links may also operate over a variety of different frequencies ranging from 600 MHz to the millimeter wave spectrum (e.g., 28-34 GHz, 60 GHz, 70 GHZ, and/or 90/95 GHz bands and beyond).

Figure 12:
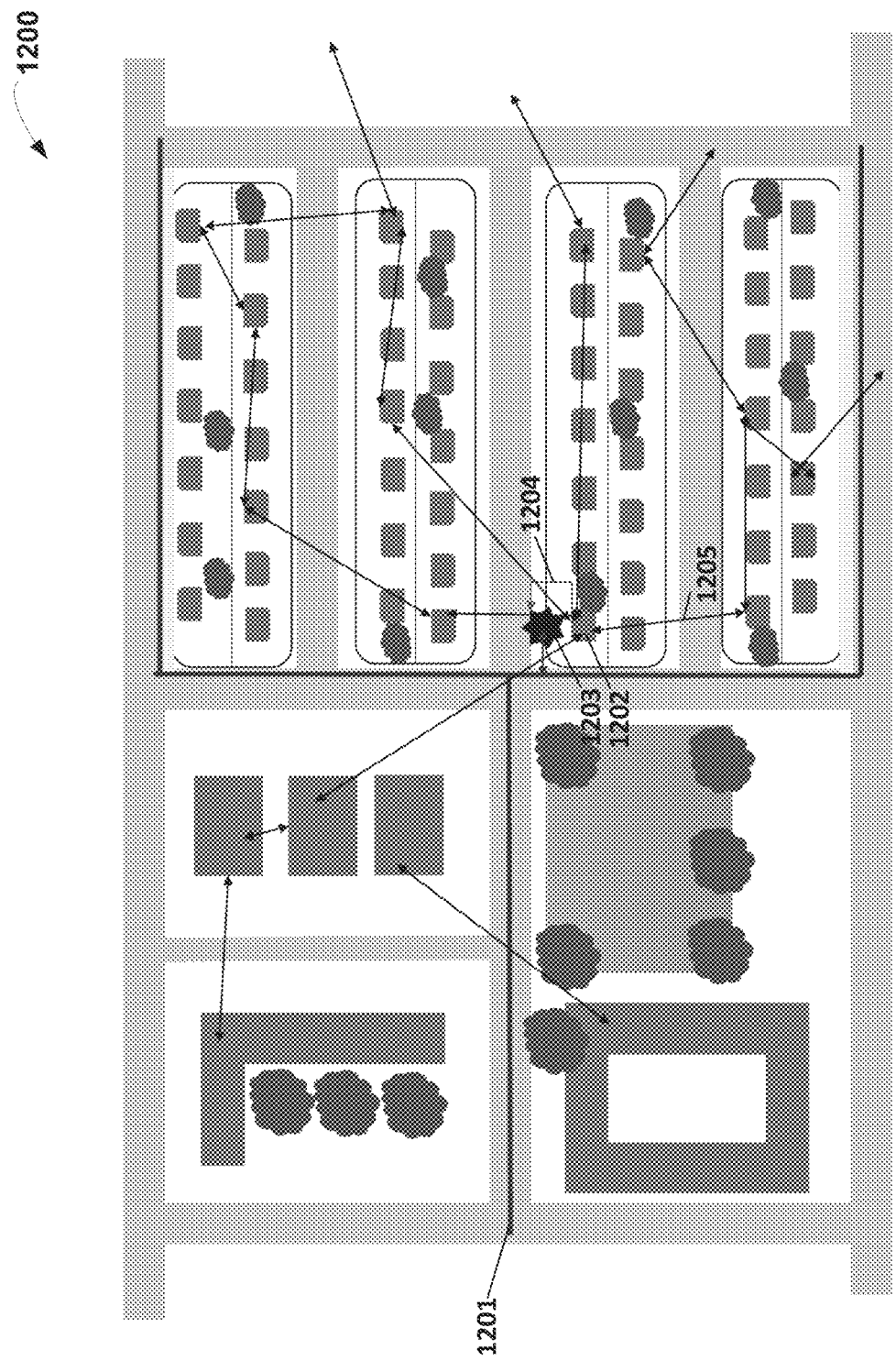
FIG. 12 depicts another example diagram of a neighborhood comprising a fiber network and a conduit, in accordance with various aspects of this disclosure.

Turning to FIG. 12, an example neighborhood 1200 is shown that is similar to neighborhood 500 of FIG. 5. For instance, neighborhood 1200 may comprise a fiber network that includes fiber links along the streets of neighborhood 1200 (e.g., fiber link 1201). In an example scenario, the fiber network may need to be extended to home 1202 to connect home 1202 to the fiber network and provide high-speed internet to home 1202.

As further shown in FIG. 12, neighborhood 1200 also includes most convenient location 1203 on the fiber network in neighborhood 1200 that may correspond to a location that is easiest to splice a new fiber link into an existing fiber link (e.g., fiber link 1201) of the fiber network. In one embodiment, most convenient location 1203 may be located at an underground utility conduit (e.g., an electric conduit or any other type of conduit capable of carrying a fiber link) either on the fiber network or in close proximity to the fiber network in neighborhood 1200. The location of the conduit may correspond to the location that is easiest to splice a new fiber link into an existing fiber link without digging the ground.

A property may then be identified that is closest to most convenient location 1203 (e.g., home 1202), which may correspond to a location where the length of fiber link 1204 between the property and most convenient location 1203 is the shortest. However, it should be understood that another property may be identified that may not necessarily correspond to a location where the length of fiber link 1204 between the property and most convenient location 1203 is the shortest.

In turn, the fiber network in neighborhood 1200 may be extended to the identified property that is closest to most convenient location 1203 (e.g., home 1202) by digging the ground from the location of the underground utility conduit (e.g., most convenient location 1203) to home 1202 and deploying fiber link 1204 between the fiber access point and home 1202.

Generally speaking, in line with the discussion above, the cost of deploying fiber link 1204 between the fiber access point and home 1202 may depend on the length of link 1204 and/or different city and/or municipality permits that may be required (e.g., to dig the ground). However, given that fiber link 1204 is relatively short (due to the close proximity of home 1202 and most convenient location 1203), the cost may be significantly less than deploying fiber link 504 of FIG. 5 between home 502 and most convenient location 503.

As further shown in FIG. 12, once home 1202 is connected to the fiber network in neighborhood 1200, home 1202 may be used as a seed node of a wireless communication mesh network with backhaul connectivity through the existing fiber network and multiple ptp or ptmp communication links (e.g., communication link 1205) may originate from home 1202 to create the wireless communication mesh network.

In general, the ptp and/or ptmp communication links that may originate from home 1202 may operate on various physical layer wireless communication protocols, such as 1G, 2G, 3G, 4G LTE, 4G WiMAX, 5G NR, 6G, 7G, Wi-Fi 802.11 ac/ad/ay etc. These ptp and/or ptmp communication links may also operate over a variety of different frequencies ranging from 600 MHz to the millimeter wave spectrum (e.g., 28-34 GHz, 60 GHz, 70 GHZ, and/or 90/95 GHz bands and beyond).

Figure 13:
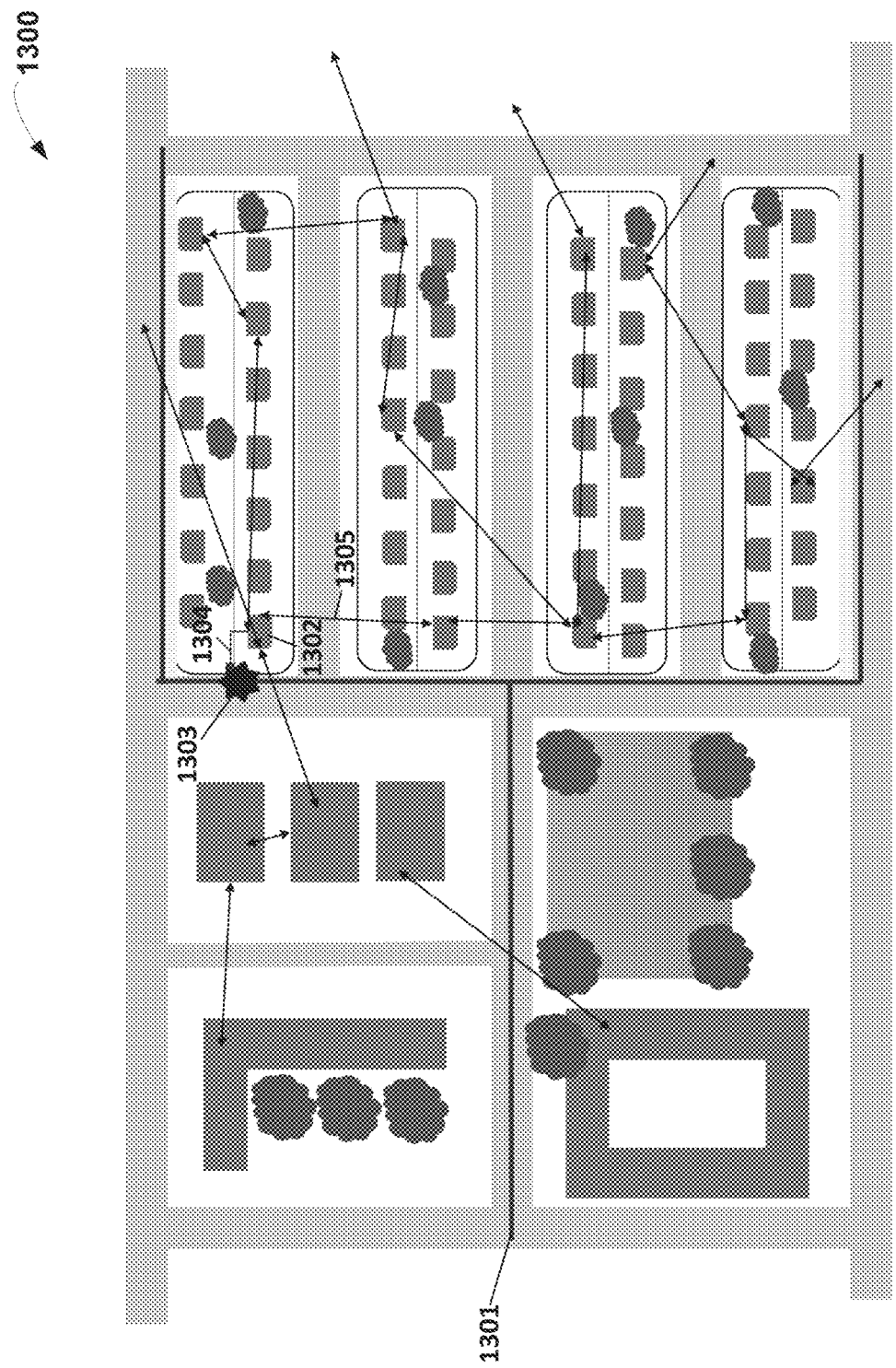
FIG. 13 depicts another example diagram of a neighborhood comprising a fiber network and an aerial fiber link, in accordance with various aspects of this disclosure.

Turning to FIG. 13, an example neighborhood 1300 is shown that is similar to neighborhood 600 of FIG. 6. For instance, neighborhood 1300 may comprise a fiber network that includes fiber links along the streets of neighborhood 1300 (e.g., fiber link 1301). In an example scenario, the fiber network may need to be extended to home 1302 to connect home 1302 to the fiber network and provide high-speed internet to home 1302.

As further shown in FIG. 13, neighborhood 1300 also includes most convenient location 1303 on the fiber network in neighborhood 1300 that may correspond to a location that is easiest to splice a new fiber link into an existing fiber link (e.g., fiber link 1301) of the fiber network. In one embodiment, most convenient location 1303 may be located in close proximity to an aerial fiber link on the fiber network in neighborhood 1300. This location in close proximity to the aerial fiber link may correspond to the location that is easiest to splice a new fiber link into an existing fiber link without digging the ground.

A property may then be identified that is closest to most convenient location 1303 (e.g., home 1302), which may correspond to a location where the length of fiber link 1204 between the property and most convenient location 1303 is the shortest. However, it should be understood that another property may be identified that may not necessarily correspond to a location where the length of fiber link 1304 between the property and most convenient location 1303 is the shortest.

In turn, the fiber network in neighborhood 1300 may be extended to the identified property that is closest to most convenient location 1303 (e.g., home 1302) by digging the ground from the location in close proximity to the aerial fiber link (e.g., most convenient location 1303) to home 1302 and deploying fiber link 1304 between the fiber access point and home 1302.

Generally speaking, in line with the discussion above, the cost of deploying fiber link 1304 between the fiber access point and home 1302 may depend on the length of link 1304 and/or different city and/or municipality permits that may be required (e.g., to dig the ground). However, given that fiber link 1304 is relatively short (due to the close proximity of home 1302 and most convenient location 1303), the cost may be significantly less than deploying fiber link 604 of FIG. 6 between home 602 and most convenient location 603.

As further shown in FIG. 13, once home 1302 is connected to the fiber network in neighborhood 1300, home 1302 may be used as a seed node of a wireless communication mesh network with backhaul connectivity through the existing fiber network and multiple ptp or ptmp communication links (e.g., communication link 1305) may originate from home 1302 to create the wireless communication mesh network.

In general, the ptp and/or ptmp communication links that may originate from home 1302 may operate on various physical layer wireless communication protocols, such as 1G, 2G, 3G, 4G LTE, 4G WiMAX, 5G NR, 6G, 7G, Wi-Fi 802.11 ac/ad/ay etc. These ptp and/or ptmp communication links may also operate over a variety of different frequencies ranging from 600 MHz to the millimeter wave spectrum (e.g., 28-34 GHZ, 60 GHz, 70 GHZ, and/or 90/95 GHz bands and beyond).

In accordance with the present disclosure, in some embodiments, a wireless communication mesh network may be built in a neighborhood by installing a pole structure that includes ptp and/or ptmp radios in an easement area of the neighborhood and using the pole structure as a seed node of the wireless communication mesh network with backhaul connectivity through an existing fiber network in the neighborhood. The pole structure may then originate ptp and/or ptmp communication links, and these ptp and/or ptmp communication links may be communicatively coupled to one or more properties (e.g., residential property units) that may be used as seed homes for the wireless communication mesh network.

Figure 14:
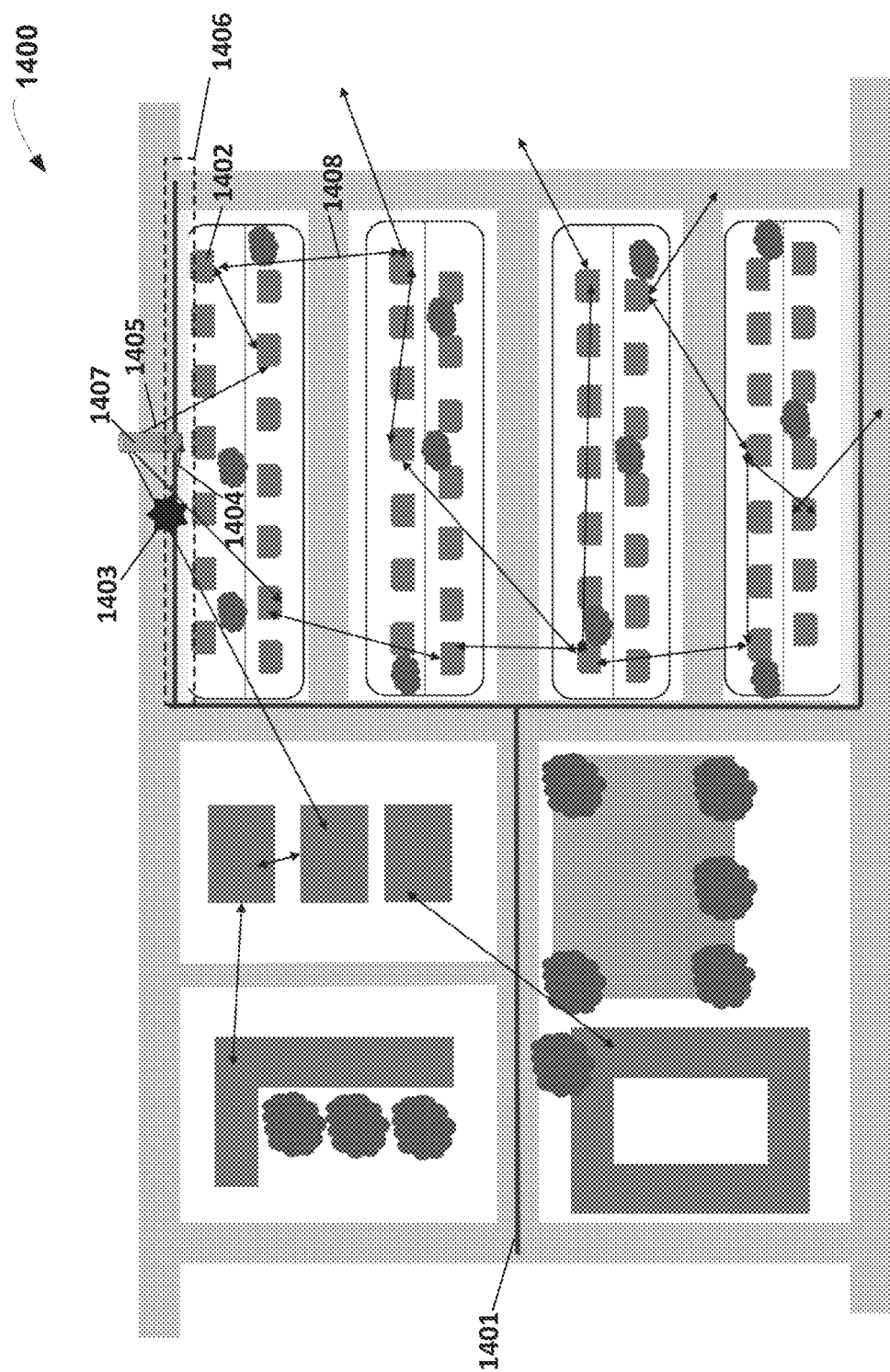
FIG. 14 depicts an example diagram of a neighborhood comprising a fiber network and a pole structure that may be used as a seed node of a wireless communication mesh network, in accordance with various aspects of this disclosure.

To illustrate, FIG. 14 depicts an example neighborhood 1400 that is similar to neighborhood 100 of FIG. 1. For instance, neighborhood 1400 may comprise easement area 1406 and a fiber network that includes fiber links along the streets of neighborhood 1400 (e.g., fiber link 1401).

As further shown in FIG. 14, neighborhood 1400 also includes most convenient location 1403 on the fiber network in neighborhood 1400 that may correspond to a location that is near (or within) easement area 1406 and is easiest to splice a new fiber link into an existing fiber link (e.g., fiber link 1401) of the fiber network. In one embodiment, most convenient location 1403 may be located at a fiber access point on the fiber network in neighborhood 1400 that is near (or within) easement area 1406. The location of the fiber access point that is near (or within) easement area 1406 may correspond to the location that is easiest to splice a new fiber link into an existing fiber link without digging the ground.

In line with the discussion above, it should be understood that most convenient location 1403 may be located at other parts near (or within) easement area 1406 as well, examples of which may include a location at a fiber splice point on the fiber network that is near (or within) easement area 1406, a location in close proximity to an aerial fiber link on the fiber network that is near (or within) easement area 1406, or a location at an underground utility conduit on the fiber network that is near (or within) easement area 1406. Further, it should be understood that most convenient location 1403 may be located at other parts of neighborhood 1400, such as a different easement area.

In line with the methods described above, a new fiber link can be extended from most convenient location 1403. However, instead of digging the ground from most convenient location 1403 to a property that is closest to most convenient location 1403 and deploying a fiber link between most convenient location 1403 and the property, pole structure 1407 may be installed in easement area 1406. The fiber network in neighborhood 1400 may then be extended to pole structure 1407 (e.g., by digging the ground from most convenient location 1403 and pole structure 1407 and deploying fiber link 1404 between most convenient location 1403 and pole structure 1407).

In order to build a wireless communication mesh network, pole structure 1407 may be equipped with ptp and/or ptmp radios, and pole structure 1407 may be used as a seed node of the wireless communication mesh network with backhaul connectivity through the fiber network in neighborhood 1400. Pole structure 1407 may then originate ptp and/or ptmp communication links (e.g., communication link 1405), and these ptp and/or ptmp communication links may be communicatively coupled to one or more properties (e.g., home 1402) that may be used as seed homes for the wireless communication mesh network. For instance, as further shown in FIG. 14, home 1402 may be used as a seed home to originate ptp and/or ptmp communication links (e.g., communication link 1408).

In line with the discussion above, the cost of deploying fiber link 1404 between the fiber access point at most convenient location 1403 and pole structure 1407 may depend on the length of fiber link 1404 and/or different city and/or municipality permits that may be required (e.g., to dig the ground). However, given that fiber link 1404 is relatively short (due to the close proximity of pole structure 1407 and most convenient location 1403), the cost may be significantly less than deploying other fiber links described above (e.g., fiber link 304 of FIG. 3, fiber link 904 of FIG. 9, etc.).

In general, the ptp and/or ptmp communication links described above may operate on various physical layer wireless communication protocols, such as 1G, 2G, 3G, 4G LTE, 4G WiMAX, 5G NR, 6G, 7G, Wi-Fi 802.11 ac/ad/ay etc. These ptp and/or ptmp communication links may also operate over a variety of different frequencies ranging from 600 MHz to the millimeter wave spectrum (e.g., 28-34 GHZ, 60 GHz, 70 GHz, and/or 90/95 GHz bands and beyond).

Further, generally speaking, the ptp and/or ptmp radios installed on pole structure 1407 may be powered via a variety of power sources, including regular electric power from a utility company, solar power, among other types of power sources.

Figure 15:
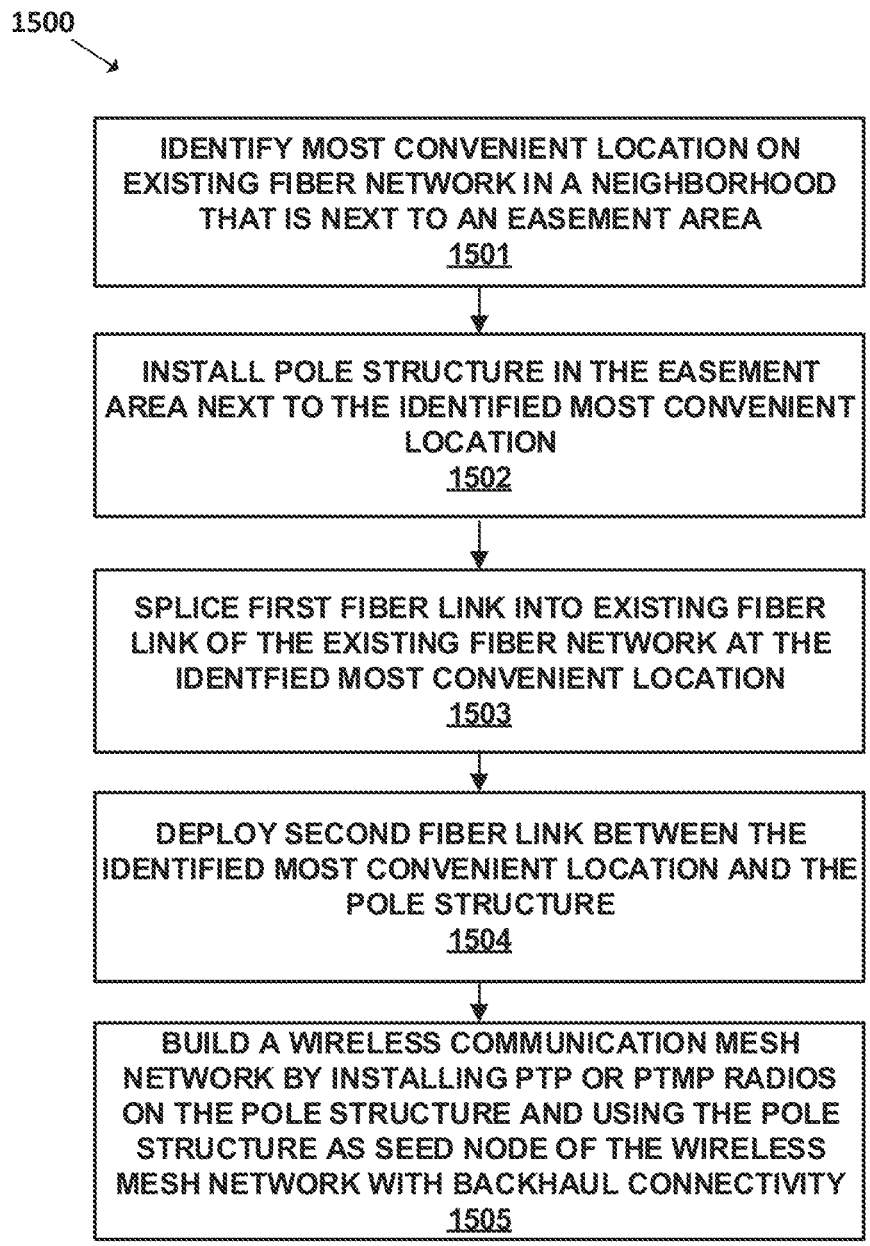
FIG. 15 depicts an example flow diagram for building a wireless communication mesh network using a pole structure, in accordance with various aspects of this disclosure.

In line with the discussion above, the method for building a wireless communication mesh network using a pole structure may take various forms. One example will now be described with reference to method 1500 of FIG. 15.

For the purposes of illustration only, it should be understood that the example functions involved in method 1500 are merely described in such manner for the sake of clarity and explanation and some functions may be carried out in various other manners as well, including the possibility that example functions may be added, removed, rearranged into different orders, grouped together, and/or not grouped together at all.

At block 1501, method 1500 may involve identifying a most convenient location on an existing fiber network in a neighborhood that is next to (or within) an easement area. In line with the discussion above, the most convenient location on the existing fiber network may be located in various parts of the neighborhood, which may include one or more easement areas. For instance, referring back to FIG. 14, the most convenient location (e.g., most convenient location 1403) may be located at a fiber access point on the fiber network in neighborhood 1400 that is next to (or within) easement area 1406.

At block 1502, method 1500 may involve installing a pole structure in the easement area that is next to the identified most convenient location. For instance, with reference to FIG. 14, pole structure 1407 may be installed in easement area 1406 that is next to (or within) most convenient location 1403.

At block 1503, method 1500 may then involve splicing a first fiber link into an existing fiber link of the existing fiber network at the identified most convenient location in order to extend the first fiber link to the pole structure and connect the pole structure to the fiber network. For instance, referring back to FIG. 14, a first fiber link may be spliced into an existing fiber link (e.g., fiber link 1401) of the fiber network at most convenient location 1403 in neighborhood 1400 without digging the ground of neighborhood 1400. One of ordinary skill in the art will appreciate that the first fiber link may be spliced into the existing fiber link in various manners.

At block 1504, method 1500 may then involve deploying a second fiber link between the identified most convenient location and the pole structure. For instance, referring back to FIG. 14, the fiber network in neighborhood 1400 may be extended to pole structure 1407 by digging the ground of neighborhood 1400 from most convenient location 1403 to pole structure 1407 and deploying fiber link 1404 between most convenient location 603 and pole structure 1407.

In turn, at block 1505, method 1500 may involve building a wireless communication mesh network by installing ptp and/or ptmp radios on the pole structure and using the pole structure as a seed node of the wireless mesh network with backhaul connectivity through the existing fiber network. For instance, referring back to FIG. 14, ptp and/or ptmp radios may be installed on pole structure 1407, and pole structure 1407 may be used as a seed node of a wireless mesh network with backhaul connectivity through the fiber network in neighborhood 1400. For example, as shown in FIG. 14, pole structure 1407 may originate ptp and/or ptmp communication links (e.g., communication link 1405), and these ptp and/or ptmp communication links may be communicatively coupled to one or more properties (e.g., home 1402) that may be used as seed homes for the wireless communication mesh network.

It should be understood that method 1500 may take various other forms. It should also be understood that some functions of method 1500 could be facilitated at least in part by computing systems associated with the entities providing the fiber network services. In this respect, each such computing system may comprise one or more processors, data storage, and program instructions that are executable to cause the computing systems to carry out some of the functions described above (e.g., block 1501, and/or block 1505).

Figure 16:
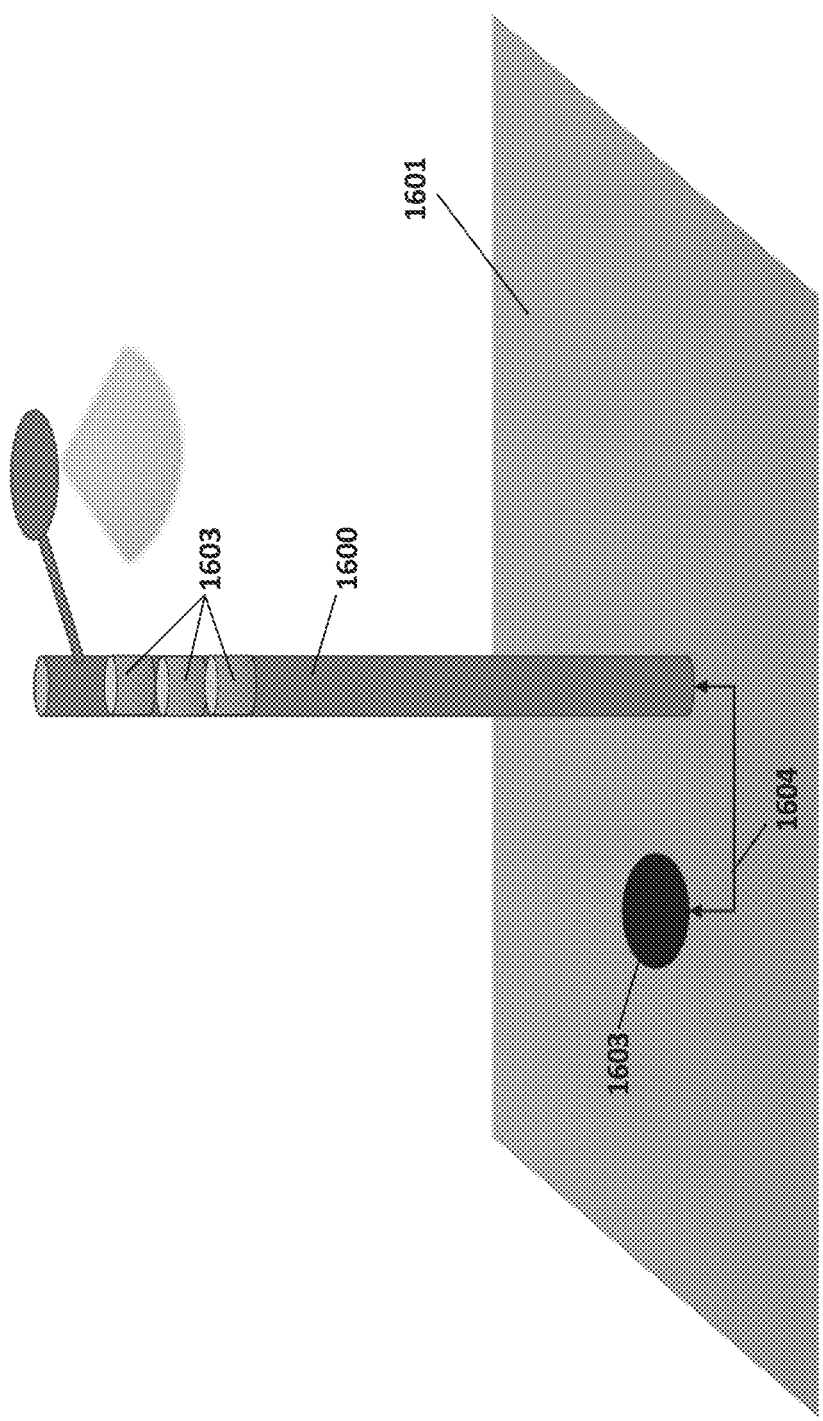
FIG. 16 depicts an example pole structure, in accordance with various aspects of this disclosure.

In general, the pole structure described above (e.g., pole structure 1407) may take various forms. To illustrate, FIG. 16 depicts an example pole structure 1600 in easement area 1601 of a neighborhood that may take the form of a pole structure of a streetlight in the neighborhood. As shown, pole structure 1600 may be coupled to a fiber access point at most convenient location 1603 via fiber link 1604 that may be deployed.

As further shown in FIG. 16, pole structure 1600 may comprise solar cell panels 1603 that can provide power to ptp and/or ptmp radios, the streetlight, and possibly other electronic circuity mounted on pole structure 1600 that may be required to use pole structure 1600 as a seed node for a wireless communication mesh network. Solar cell panels 1603 may be cylindrically shaped to prevent pole structure 1600 from swaying during high wind conditions in addition to being aesthetically appealing.

It should be understood that while pole structure 1600 is shown to include three solar panels, any number of solar panels can be integrated with pole structure 1600, which may depend on the total power requirement of the ptp and/or ptmp radios (and associated hardware) mounted on pole structure 1600.

Figure 17B:
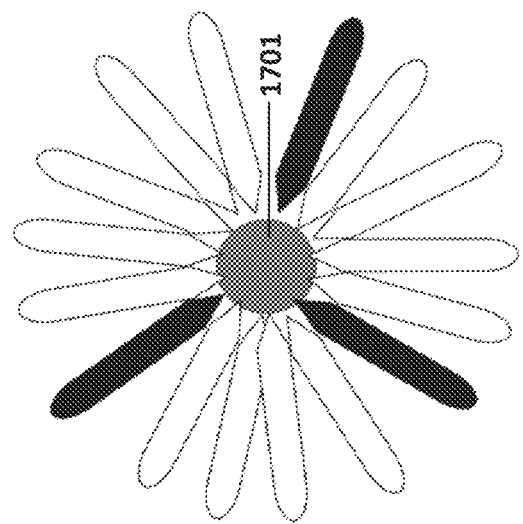
FIG. 17B depicts an example pole structure comprising ptmp radios with beam selection capability, in accordance with various aspects of this disclosure.
Figure 17A:
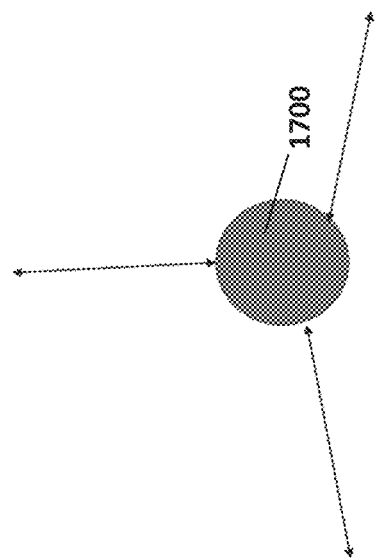
FIG. 17A depicts an example pole structure comprising ptp communication links, in accordance with various aspects of this disclosure.

Turning to FIG. 17A, an example pole structure 1700 that may be similar to pole structure 1407 of FIG. 14 is shown. For instance, as shown, pole structure 1700 may be used as a seed node of a wireless communication mesh network with backhaul connectivity through an existing fiber network of a neighborhood and originate 3 ptp communication links that can be used to connect three different nodes of the wireless communication mesh network (e.g., three different homes). These ptp communication links may have very narrow beams and/or low side lobes, and can be steerable or non-steerable.

Turning to FIG. 17B, another example pole structure 1701 that may be similar to pole structure 1407 of FIG. 14 is shown. For instance, as shown, pole structure 1701 may include ptmp radios with beam selection capability, and pole structure 1701 may be used as a seed node of a wireless communication mesh network with backhaul connectivity through an existing fiber network of a neighborhood.

As further shown in FIG. 17B, these ptmp radios may generate several possible beams. In one embodiment, these ptmp radios may be used in a ptp mode where each ptmp radio mounted on pole structure 1701 can establish a link with a radio located at a respective property (e.g., a residential property unit, such as home 1402) over a respective beam (e.g., a respective beam shaded in black in FIG. 17B). The respective properties may then be used as seed homes for the wireless communication mesh network.

It should be understood that different beams (e.g., beams other than the beams shaded in black) may be selected depending on the direction of a desired seed home that establishes a link with one of the ptmp radios. In this respect, the beam selection capability of these ptmp radios may enable these radios to switch to a different beam in another direction in the event of interference from changes in the line-of-sight profile to ensure connectivity with the wireless communication mesh network. In practice, the beam selection capability of these ptmp radios may be facilitated by a computing system that has the capability to process the wireless communication mesh network traffic and interference statistics and determine which seed homes the ptmp radios mounted on pole structure 1701 should establish a link.

Further, it should be understood that more or less number of beams may be selected to establish a link with more or less properties that may be used as seed homes for the wireless communication mesh network, which may depend on the power budget, wireless communication mesh network topology, etc.

In accordance with the present disclosure, in another aspect, disclosed herein are systems and methods that relate to wireless communication mesh network design, installation, and deployment. For instance, after building a wireless communication mesh network as described above, the present systems and methods may involve a pre-marketing phase that includes various sub-phases, such as social media/online marketing, radio/television-based marketing, and mailer-based marketing, that can generate leads for potential customers (and/or their corresponding customer locations) that expressed interest in subscribing to an internet service based on a wireless communication mesh network. Based on these leads, an area of interest ("AOI") is identified that is used for subsequent door-to-door marketing and sales. A door-to-door marketing/sales agent then uploads information about potential customers who signed an agreement to a computing system (e.g., a server or shared drive) or accesses a software application (e.g., a mobile application) to provide real-time information about potential customers (e.g., mesh network information associated with a given potential customer) to a network-planning engine. The software application may also receive information about potential customers from the pre-marketing phase and send the information to the network-planning engine.

Based on various criteria defined herein, the network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer (and/or its respective location) from a disqualified status to a selected status or from a selected status to a disqualified status. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. A similar indoor power box as explained earlier may also be installed during this door-to-door marketing phase. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

In another aspect, the present systems and methods may involve identifying an AOI that is selected based on multiple factors. Based on the identified AOI, a pre-marketing phase that includes various sub-phases, such as social media/online marketing, radio/television-based marketing and mailer-based marketing, is executed to generate leads for potential customers (and/or their corresponding customer locations) that expressed interest in subscribing to an internet service based on a wireless communication mesh network. The disclosed process may then transition to a door-to-door marketing phase as described above.

Based on various criteria defined herein, a network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer location from a disqualified status to a selected status and vice versa. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

Example embodiments of the disclosed innovations have been described above. Those skilled in the art will understand, however, that changes and modifications may be made to the embodiments described without departing from the true scope and spirit of the present invention, which will be defined by claims.

Further, while example embodiments have been described with reference to a particular neighborhood, it should be understood that a wireless communication mesh network can be built for any geographical area (e.g., an entire city, county, and/or metro) based on the same concepts described above. It should also be understood that any type of property (e.g., residential property or commercial property) can be identified as a property that is to be connected to an existing fiber network, and the property (that may be closest to a most convenient location) may then be used as a seed node of a wireless communication mesh network that has backhaul connectivity through the existing fiber network in accordance with the examples discussed above.

Further yet, to the extent that examples described herein involve operations performed or initiated by actors, such as humans, operators, users or other entities, this is for purposes of example and explanation only. Claims should not be construed as requiring action by such actors unless explicitly recited in claim language.

The invention claimed is:

1. A method of extending a preexisting fiber network comprising a plurality of preexisting fiber links to a plurality of installation sites for wireless communication nodes within a wireless communication mesh network, wherein the preexisting fiber network is associated with a geographical area that includes a plurality of buildings, the method comprising:
    identifying a given location within the geographical area as being convenient for extending the preexisting fiber network;
    identifying a plurality of installation sites for wireless communication nodes to be connected to the preexisting fiber network;
    based on one or more of (i) a height of each identified installation site, (ii) a density of residential properties near each identified installation site, and (iii) an elevation profile of an area where each identified installation site is located, identifying, from the plurality of installation sites, an installation site for a wireless communication node to be used as a seed node of the wireless communication mesh network, wherein the wireless communication node to be used as the seed node is configured to originate one or more point-to-point (ptp) or point-to-multipoint (ptmp) communication links for connecting to one or more other wireless communication nodes within the wireless communication mesh network, and wherein each wireless communication node of the one or more other wireless communication nodes within the wireless communication mesh network is installed at a respective installation site that comprises a respective building of a respective individual who has subscribed to an internet service of the wireless communication mesh network; and
    deploying one or more additional fiber links between (i) the given location and (ii) the installation site for the wireless communication node to be used as the seed node, the one or more additional fiber links being spliced into a given one of the plurality of preexisting fiber links of the preexisting fiber network at the given location, and the wireless communication node of the installation site for the wireless communication node to be used as the seed node thereafter providing backhaul connectivity for the wireless communication mesh network through the preexisting fiber network via the one or more additional fiber links.

2. The method of claim 1, wherein the identified installation site for the wireless communication node to be used as the seed node is either a building or a pole structure located within the geographical area.

3. The method of claim 1, wherein the given location is one of (a) a location of a preexisting fiber access point on the preexisting fiber network, (b) a location of a preexisting fiber splice point on the preexisting fiber network, (c) a location of an underground utility conduit in proximity to the preexisting fiber network, or (d) a location in proximity to an aerial fiber link on the preexisting fiber network.

4. The method of claim 1, wherein the installation site for the wireless communication node to be used as the seed node comprises a residential or commercial building within the geographical area.

5. The method of claim 4, wherein identifying the installation site for the wireless communication node to be used as the seed node is further based on proximity of the residential or commercial building to the given location.

6. The method of claim 1, wherein the installation site for the wireless communication node to be used as the seed node comprises a building of an individual who has subscribed to an internet service of the wireless communication mesh network.

7. The method of claim 1, wherein the wireless communication node to be used as the seed node is configured to provide the backhaul connectivity for the wireless communication mesh network through the preexisting fiber network via the one or more additional fiber links.

8. The method of claim 1, wherein the method further comprises:
    deploying one or more ptp or ptmp radios at the installation site for the wireless communication node to be used as the seed node.

9. The method of claim 8, further comprising:
    deploying one or more solar cell panels at the installation site for the wireless communication node to be used as the seed node that are configured to provide power to the one or more ptp or ptmp radios.

10. The method of claim 1, wherein the installation site for the wireless communication node to be used as the seed node comprises a pole structure located within the geographical area.

11. The method of claim 1, wherein based on one or more of (i) the height of each identified installation site, (ii) the density of residential properties near each identified installation site, and (iii) the elevation profile of the area where each identified installation site is located, identifying, from the plurality of installation sites, the installation site for the wireless communication node to be used as the seed node of the wireless communication mesh network comprises:
    based on (i) the height of each identified installation site, (ii) the density of residential properties near each identified installation site, and (iii) the elevation profile of the area where each identified installation site is located, identifying, from the plurality of installation sites, the installation site for the wireless communication node to be used as the seed node of the wireless communication mesh network.

12. A method of extending a preexisting fiber network comprising a plurality of preexisting fiber links to a plurality of installation sites for wireless communication nodes within a wireless communication mesh network, wherein the preexisting fiber network is associated with a geographical area that includes a plurality of buildings, the method comprising:
    identifying a given location within the geographical area for extending the preexisting fiber network;

identifying a plurality of installation sites for wireless communication nodes to be connected to the preexisting fiber network;

based on one or more of (i) a height of each identified installation site, (ii) a density of residential properties near each identified installation site, and (iii) an elevation profile of an area where each identified installation site is located, identifying, from the plurality of installation sites, an installation site for a wireless communication node to be used as a seed node of the wireless communication mesh network, wherein the wireless communication node to be used as the seed node is configured to originate one or more point-to-point (ptp) or point-to-multipoint (ptmp) communication links for connecting to one or more other wireless communication nodes within the wireless communication mesh network, and wherein each wireless communication node of the one or more other wireless communication nodes within the wireless communication mesh network is installed at a respective installation site that comprises a respective building of a respective individual who has subscribed to an internet service of the wireless communication mesh network;

deploying one or more additional fiber links between (i) the given location and (ii) the installation site for the wireless communication node to be used as the seed node, the one or more additional fiber links being spliced into a given one of the plurality of preexisting fiber links of the preexisting fiber network at the given location; and deploying the wireless communication node of the installation site for the wireless communication node to be used as the seed node, wherein the wireless communication node provides backhaul connectivity for the wireless communication mesh network through the preexisting fiber network via the one or more additional fiber links.

13. A communication system comprising:

a preexisting fiber network associated with a geographical area that includes a plurality of buildings, wherein the preexisting fiber network comprises a plurality of preexisting fiber links; and a plurality of wireless communication nodes within a wireless communication mesh network, wherein each wireless communication node of the plurality of wireless communication nodes is installed at a respective installation site of a plurality of installation sites, wherein the plurality of installation sites comprises an installation site for a wireless communication node to be used as a seed node of the wireless communication mesh network, wherein the installation site for the wireless communication node to be used as the seed node is identified based on one or more of (i) a height of each installation site of the plurality of installation sites, (ii) a density of residential properties near each installation site of the plurality of installation sites, and (iii) an elevation profile of an area where each installation site of the plurality of installation sites is located, wherein the preexisting fiber network is extended to the installation site for the wireless communication node to be used as the seed node via one or more additional fiber links that are deployed between (i) a given location within the geographical area identified as being convenient for extending the preexisting fiber network and (ii) the installation site for the wireless communication node to be used as the seed node, and wherein the wireless communication node to be used as the seed node is configured to (i) originate one or more point-to-point (ptp) or point-to-multipoint (ptmp) communication links for connecting to one or more other wireless communication nodes within the wireless communication mesh network and (ii) provide backhaul connectivity for the wireless communication mesh network through the preexisting fiber network via the one or more additional fiber links, and wherein each wireless communication node of the one or more other wireless communication nodes within the wireless communication mesh network is installed at a respective installation site that comprises a respective building of a respective individual who has subscribed to an internet service of the wireless communication mesh network.

14. The communication system of claim 13, wherein the identified installation site for the wireless communication node to be used as the seed node is either a building or a pole structure located within the geographical area.

15. The communication system of claim 13, wherein the given location within the geographical area identified as being convenient for extending the preexisting fiber network is one of (a) a location of a preexisting fiber access point on the preexisting fiber network, (b) a location of a preexisting fiber splice point on the preexisting fiber network, (c) a location of an underground utility conduit in proximity to the preexisting fiber network, or (d) a location in proximity to an aerial fiber link on the preexisting fiber network.

16. The communication system of claim 13, wherein the installation site for the wireless communication node to be used as the seed node comprises a residential building or a commercial building within the geographical area.

17. The communication system of claim 13, wherein the installation site for the wireless communication node to be used as the seed node comprises a given building, and wherein one or more ptp or ptmp radios are installed on a roof of the given building.

18. The communication system of claim 13, wherein each ptp communication link comprises a very-narrow beam and a low side lobe, and wherein each ptmp communication link comprises beam selection capability.

19. The communication system of claim 13, wherein the installation site for the wireless communication node to be used as the seed node comprises a pole structure located within the geographical area, and wherein the pole structure is installed with one or more ptp or ptmp radios, and wherein the pole structure comprises one or more solar cell panels that are configured to provide power to the one or more ptp or ptmp radios.

20. The communication system of claim 13, wherein the one or more additional fiber links comprise a first fiber link that is spliced into a given one of the plurality of preexisting fiber links of the preexisting fiber network at the given location and a second fiber link that is extended from the given location to the installation site for the wireless communication node to be used as the seed node.

* * * * *